United States Patent [19]

Ogawa et al.

[11] 4,240,700
[45] Dec. 23, 1980

[54] WIDE ANGLE ZOOM LENS HAVING A HIGH VARIATION RATIO

[75] Inventors: Ryota Ogawa, Kawagoe; Sadao Okudaira, Ranzan; Satoru Tachihara, Wako, all of Japan

[73] Assignee: Asahi Kogaku Kabushiki Kaisha, Tokyo, Japan

[21] Appl. No.: 929,763

[22] Filed: Jul. 28, 1978

[30] Foreign Application Priority Data

Jul. 30, 1977 [JP] Japan ................. 52-91846

[51] Int. Cl.³ .......................... G02B 15/16
[52] U.S. Cl. ............................... 350/184
[58] Field of Search ................ 350/184, 186

[56] References Cited

U.S. PATENT DOCUMENTS

| | | | |
|---|---|---|---|
| 3,549,242 | 12/1970 | Higuchi et al. | 350/184 |
| 3,771,853 | 11/1973 | Nakamura | 350/184 |
| 3,840,290 | 10/1974 | Betensky | 350/184 |
| 3,920,315 | 11/1975 | Linke | 350/184 |
| 3,975,089 | 8/1976 | Betensky | 350/184 |

*Primary Examiner*—Conrad J. Clark
*Attorney, Agent, or Firm*—Sughrue, Rothwell, Mion, Zinn and Macpeak

[57] ABSTRACT

The present invention relates to a wide angle zoom lens system having a high variation ratio and a zooming range between a wide angle and a semi-telescopic angle, with the zoom ratio being approximately 2.3 to 3.0 times. The present invention provides the wide variation especially at the wide angle portion of the zoom. The present invention comprises, in order from the object side, a first lens group I having a positive focal length $f_I$, a second lens group II (also referred to as a first variator lens group) having a negative focal length $f_{II}$, and a third lens group III (also referred to as a second variator lens group) having a positive focal length $f_{III}$. The present invention may include a lens group III′ having a positive focal length $f_{III'}$. The lens group III′ may be disposed along the optical axis either at the image side or at the object side of the third lens group III. The lens group III′ is unmovable during zooming. Both the first and second variator lens groups II, III provide a variation effect so as to produce simultaneously a component of the total variator effect.

12 Claims, 30 Drawing Figures

FIG. 1
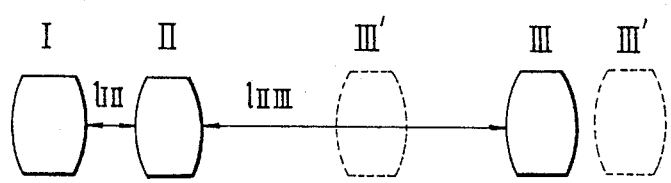
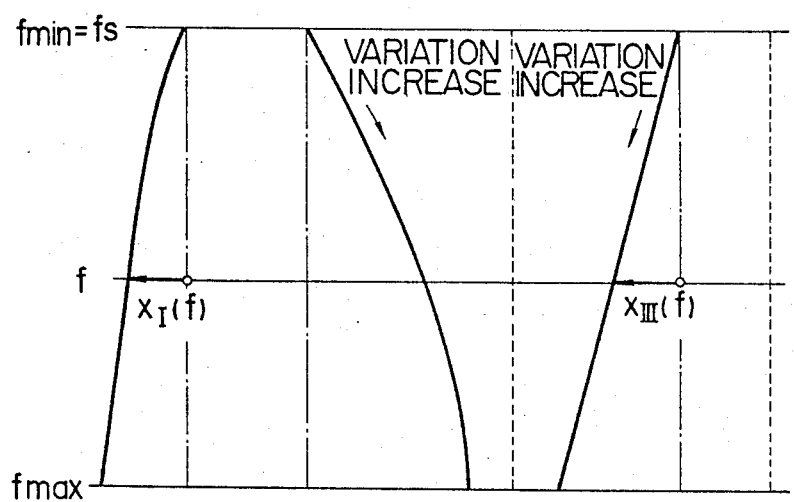
$x_I(f) = k(f) \; x_{III}(f)$
$0 \leq k(f) \leq 3.0$

FIG. 4
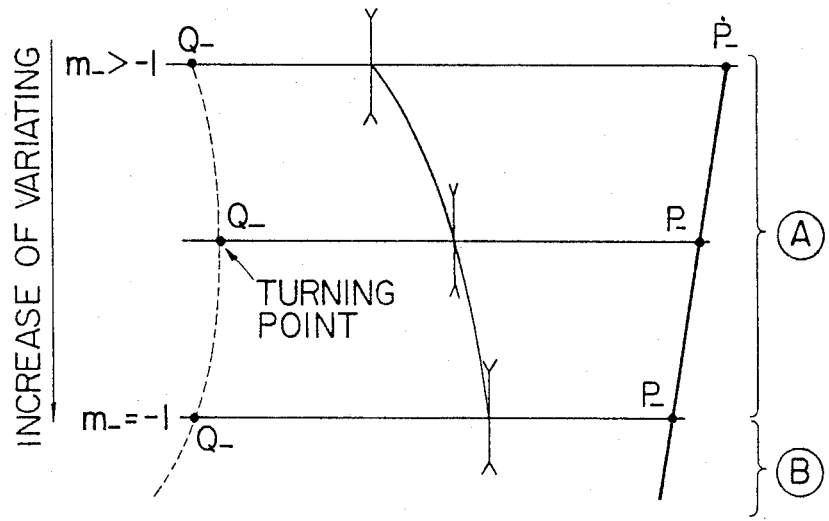
FIG. 5
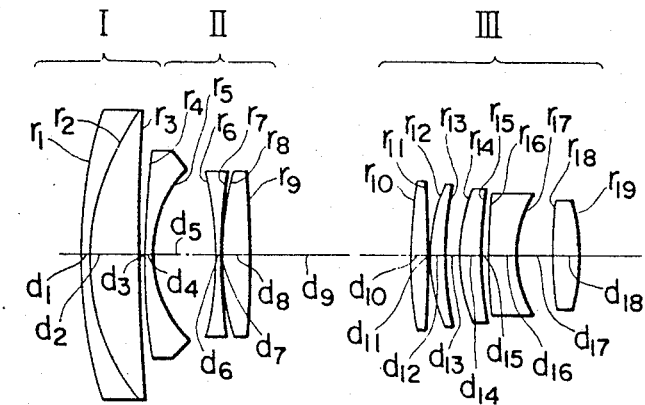
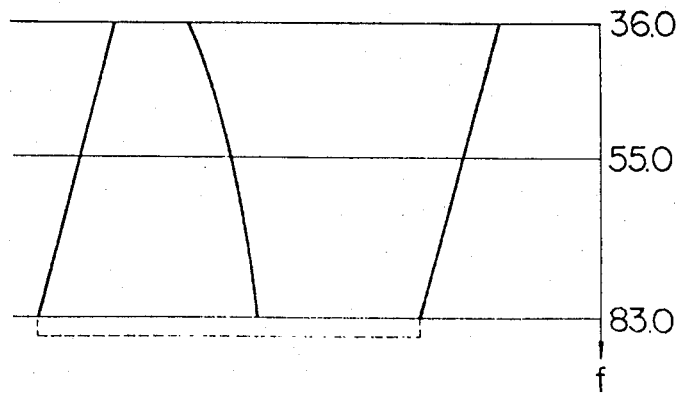

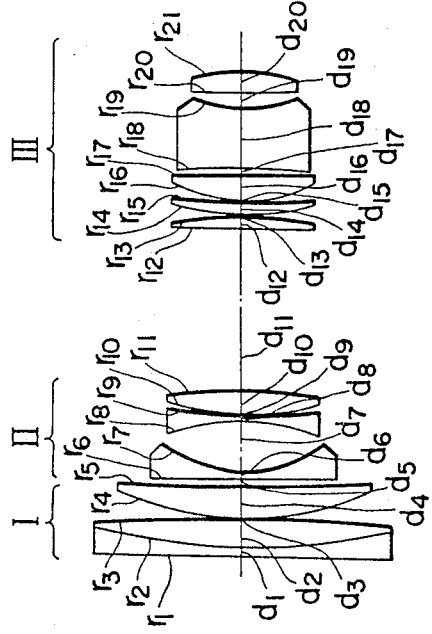
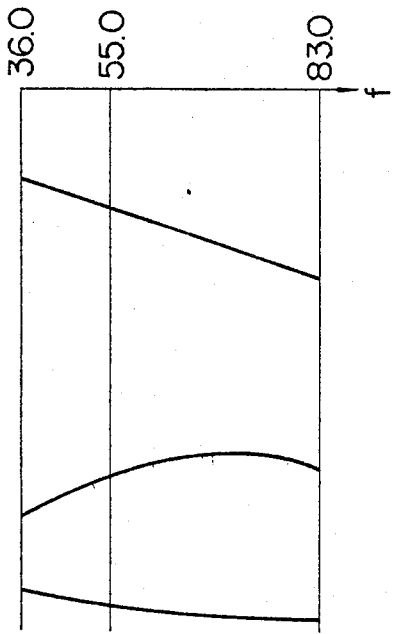
FIG. 6
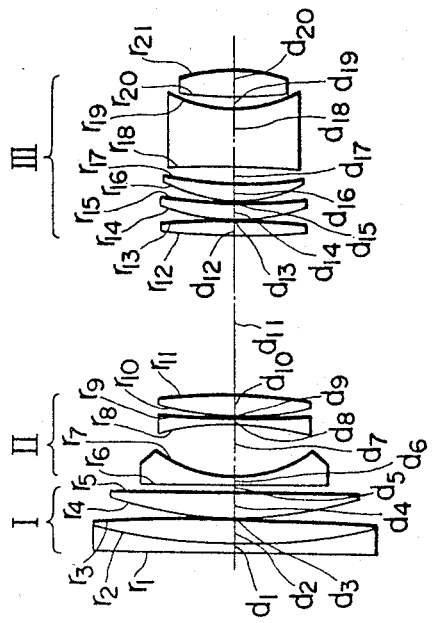
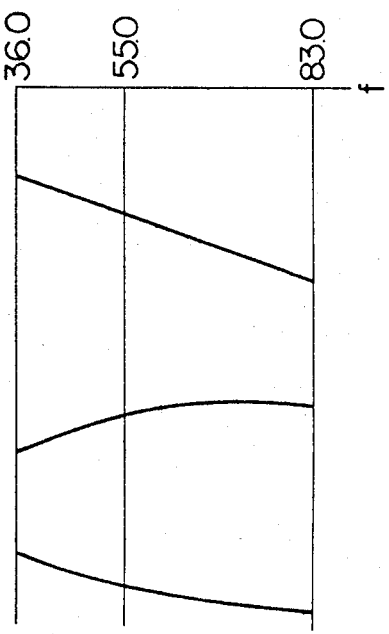
FIG. 7

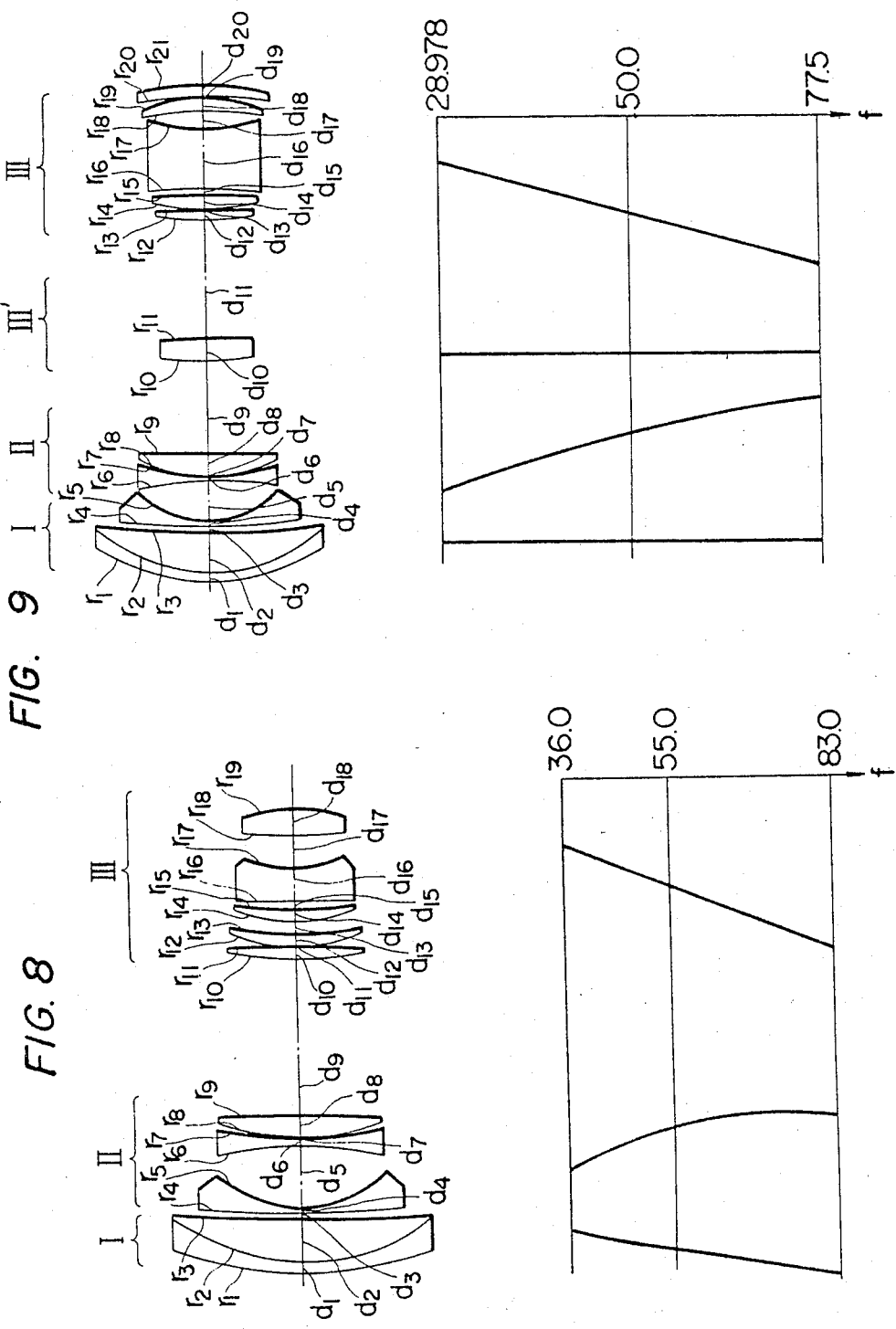

WIDE ANGLE ZOOM LENS HAVING A HIGH VARIATION RATIO

BACKGROUND OF THE INVENTION

1. Field of the Invention

The present invention relates generally to a wide angle zoom lens system having a high variation ratio, and more particularly, to a wide angle zoom lens system having a zooming range between a wide angle and a semi-telescopic angle, with a zoom ratio of approximately 2.3 to 3.0 times.

2. Description of the Prior Art

For example, in a 35 mm camera having a film frame of 36×24 mm, the wide angle range is in range of focal lengths between 28 mm and 35 mm. In respect to this wide angle range, Japanese patent application Ser. No. 52-55046 discloses a lens system having a high variation ratio which provides such a zooming range. Japanese patent application Ser. No. 52-55046 discloses the so-called two-lens group-type zoom lens system having a front lens group which exhibits a negative lens power, and a rear lens group which exhibits a positive lens power. The front lens group and the rear lens group are independently moved axial with respect to each other.

In such a two-lens group-type zoom lens system, the following inherent disadvantages are present. Because the zoom variation effect depends only on the rear lens group, the amount of zoom movement of the front and rear lens groups tends to be long in order to maintain the high zoom variation ratio. In addition, the aperture of the lens most adjacent the object tends to be large, and the variation of the luminous flux position is very substantial during zooming, especially in the front lens group. Moreover, the angle defined by the luminous flux and each lens element tends to be varied in proportion to the zoom variation ratio in the rear lens group.

In order to eliminate the above-mentioned deficiencies, each lens group and each lens thereof must have a high lens power. The high lens power, however, requires that the aberration variations be tightly controlled due to the inclination of each lens element. Because at the narrow angle end the variation of the width of the luminous flux incidental to the front lens group increases in proportion to the zoom variation ratio, the conventional two-lens group type zoom lens system requires tight control in order to offset the aberrations, that is, a delicate lens. Thus, the conventional two-lens group type zoom lens system is a delicate lens system that is difficult to operate so as to produce optimum optical results.

SUMMARY OF THE INVENTION

The present invention relates to a wide angle zoom lens system having a high variation ratio and a zooming range between a wide angle and a semi-telescopic angle, with the zoom ratio being approximately 2.3 to 3.0 times. The present invention provides the wide variation especially at the wide angle portion of the zoom. The present invention comprises, in order from the object side, a first lens group I having a positive focal length $f_I$, a second lens group II (also referred to as a first variator lens group) having a negative focal length $f_{II}$, and a third lens group III (also referred to as a second variator lens group) having a positive focal length $f_{III}$. The present invention may include a lens group III' having a positive focal length $f_{III'}$. The lens group III' may be disposed along the optical axis either at the image side or at the object side of the third lens group III. The lens group III' is unmovable during zooming. Both the first and second variator lens groups II, III provide a variation effect so as to produce simultaneously a component of the total variator effect.

BRIEF DESCRIPTION OF THE DRAWINGS

FIG. 1 is a simplified cross-sectional view of the general case in block diagram form of the placement of the lens groups in the present invention and plots the movement of the lens groups where the coefficient $k(f)$ is variable with respect to the focal length $f$;

FIG. 3a, 3b and 4 plot the simultaneous variation effect during zooming;

FIG. 5 is a simplified cross-sectional view of the wide angle zoom lens system according to Example 1 of the present invention;

FIG. 6 is a simplified cross-sectional view of the wide angle zoom lens system according to Example 2 of the present invention;

FIG. 7 is a simplified cross-sectional view of the wide angle zoom lens system according to Example 3 of the present invention;

FIG. 8 is a simplified cross-sectional view of the wide angle zoom lens system according to Example 4 of the present invention;

FIG. 9 is a simplified cross-sectional view of the wide angle zoom lens system according to Example 5 of the present invention;

DETAILED DESCRIPTION OF THE INVENTION

Figure 2A:
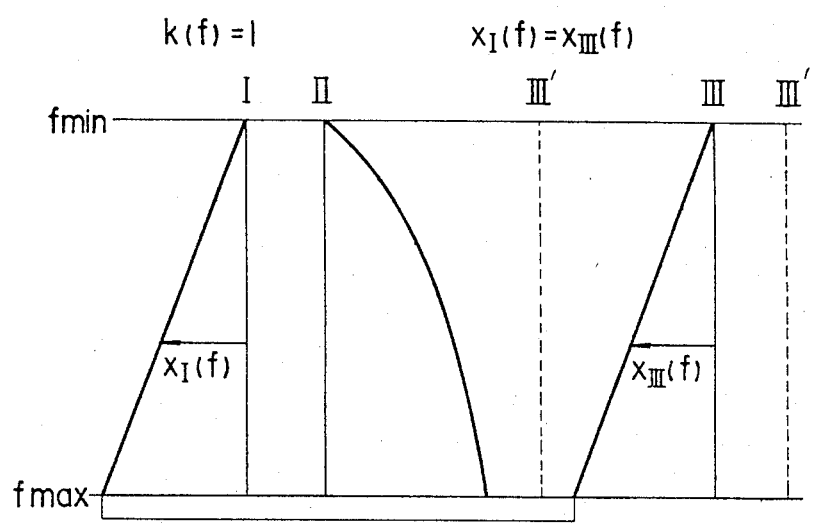
FIG. 2a plots the movement of the lens groups for the case when $X_I(f) = X_{III}(f)$, that is, $k(f) = 1.0$.

The wide angle zoom lens of the present invention is composed, in order from the object side, of a first lens group I having a positive focal length $f_I$, a second lens group II (also referred to as a first variator lens group)

having a negative focal length $f_{II}$, and a third lens group III (also referred to as a second variator lens group) having a positive focal length $f_{III}$. The present invention may include a lens group III' having a positive focal length $f_{III'}$ at the image side or at the object side of the third lens group III. The lens group III' is unmovable during zooming. Both the first and second variator lens groups II, III provide a variator effect so as to produce simultaneously a component of the total variator effect.

The amount of the axial displacement of the first lens group I satisfies the equation below, when the amount of movement of the first lens group I and the third lens group III at an arbitrary focal length f is within the wide angle range of the zoom:

$$x_I(f) = k(f) x_{III}(f) \quad (1)$$

where:

$0 \leq k(f) \leq 3.0$ $x_I(f)$ is the amount of axial movement of the first lens group, $x_{III}(f)$ is the amount of axial movement of the third lens group, and $k(f)$ is a coefficient.

Furthermore, when the overall focal length at the wide angle end of the zoom is designated as $f_s$, the aerial space between the first lens group I and second lens group II is at the wide angle end of the zoom designated as $l_{I,II}$ and the aerial space between the second lens group II and third lens group III at the wide angle end of the zoom is designated as $l_{II,III}$. At this wide angle end of the zoom, the present invention satisfies the following conditions:

$$1.7 < f_I/f_s < 5.0 \quad (2)$$

$$0.6 < |f_{II}|/f_s < 1.5 \quad (3)$$

$$0 < l_{I,II}/f_s < 0.2 \quad (4)$$

$$0.6 < l_{II,III}/f_s < 1.8 \quad (5)$$

As is apparent from these conditions, the zoom lens of the present invention overcomes the defects inherent to the above-mentioned two-lens group-type zoom lens system by providing a wide variation ratio at especially at the wide angle portion of the zoom.

Figure 2B:
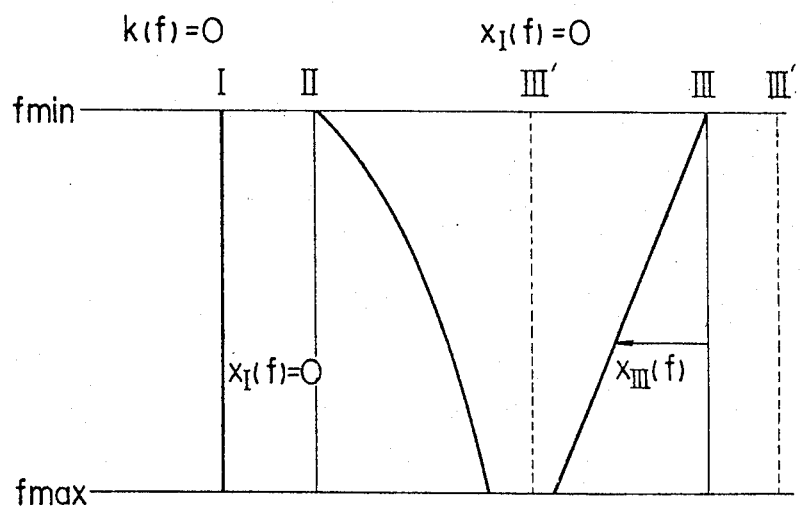
FIG. 2b plots the movement of the lens groups for the case when $X_I(f) = 0$, that is $k(f) = 0$.

The basic lens construction of the present invention is now described with reference to FIGS. 1, 2(a) and 2(b). FIG. 1 shows a general case in block diagram form of the placement of the lens groups in the present invention and plots the movement of the lens group where the coefficient $k(f)$ is variable with respect to the focal length f. FIG. 2(a) plots the case when $k(f)=1.0$. FIG. 2(b) plots the case when $k(f)=0$. It should be noted that in the case of FIG. 2(a), the first lens group I and third lens group III are moved together, while in the case of FIG. 2(b), the first lens group I is fixed.

Because the first lens group exhibits a positive lens power, the variating effect of the second lens group II (first variator lens group) is readily achieved. This point of the present invention is clearly distinguishable from the conventional two-lens group-type zoom lens where the lens group having a negative lens power does not produce any variating effect.

The zoom lens system of the present invention simultaneously satisfies the conditions (2), (3), (4) and (5) given above so that the increasing variation effect is simultaneously produced by the first and second variator lens groups. The compliance with conditions (2), (3), (4) and (5) above overcomes the above-noted defect shown by equation (1) that is inherent in the two-lens group-type zoom lens. Satisfaction of the conditions (2), (3), (4) and (5) above results in the zoom lens system of the present invention exhibiting a well balanced variating effect. Satisfaction of condition (2) eliminates substantially another defect present in the conventional two-lens group-type zoom lens because in the present invention the width of the incidental luminous flux is reduced due to the position of the second lens group II, especially at the telescopic end, by the optical convergent effect of the first lens group. At the same time, the present invention minimizes the negative lens power required of the second lens group II, as shown by condition (3). Thus, satisfaction of conditions (1), (3), (4) and (5) allows the zoom lens of the present invention having a high zoom variation ratio to be realized effectively.

Since the third lens group III has a positive lens power, the overall focal length becomes positive. At the same time, both of the variator lens groups simultaneously produce the multiplied variation effect, causing the transfer of the variation movement of the image point position of the second lens group II together with the movement of the second lens group II as a objective point to the third lens group III, while maintaining the image point of the third lens group III constant. This simultaneous increasing variation effect is effective to obtain a zoom lens having a high zoom variation ratio. The optical theory on which the present invention operates is now described with reference to FIGS. 3 and 4.

Figure 3A:
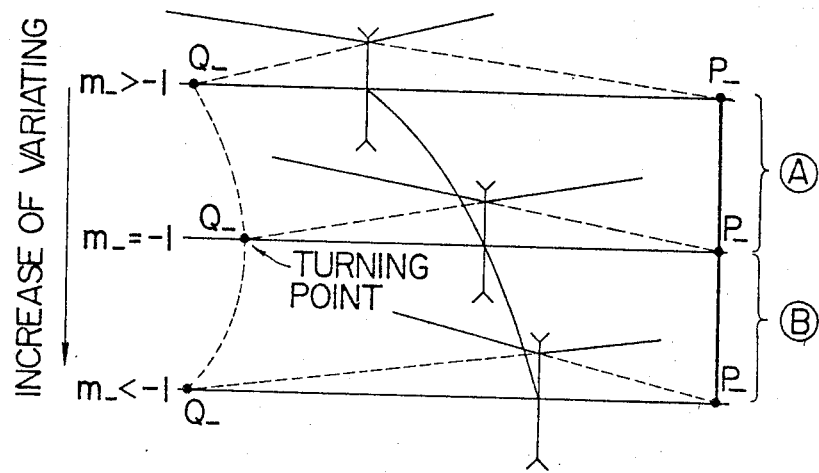

FIG. 3(a) shows an increasing variation, i.e., magnification effect of a negative lens, for example, the increasing variation effect produced by the first variator lens group of the present invention. As shown in FIG. 3(a), the variation ratio is increased from the upper portion to the lower portion through the position of the iso-variation ratio. For purposes of simplification, a locus P which represents the objective point, is fixed on the solid line shown in FIG. 3(a). This means that the position of the first lens group before the negative lens group is fixed. The locus of an image point Q– shown by the dotted line, is moved to the right in a low variation ratio (region A) and to the left in high variation ratio (region B), with respect to the iso-variation ratio at $m = -1$, (also referred to as the iso-magnification point).

Figure 3B:
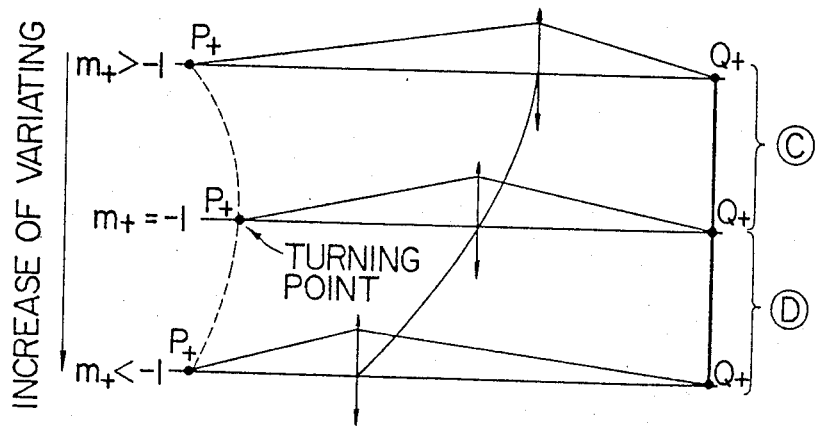

FIG. 3(b) shows an increasing variation effect of, for example, the increasing variation effect produced by the third lens, second variator lens group, As shown in FIG. 3(b), the variation ratio is increased from the upper portion to the lower portion through the position of the iso-variation ratio. In this case the locus of an image point Q+ is fixed on the solid line. This means that the focal point after the positive lens is constant or fixed. The locus of an objective point P+, shown by a dotted line, is moved to the right in the low variation ratio (region C) and to the left in high variation ratio (region D), with respect to iso-variation ratio at $m+ = -1$. The trend of the locus of P+ is the same as that of the locus Q– in FIG. 3(a).

The variator system of the present invention is composed, in order, of the negative lens and the positive lens, as illustrated in FIGS. 3(a) and 3(b). This means that the variator system permits the coincidence of the image point of the negative lens shown in FIG. 3(a) with the objective point of the positive lens shown in FIG. 3(b), that is, the coincidence of the locus of Q– with that of the locus of P+. However, the simultaneously increasing variation of the negative lens and the positive lens is established under a defined condition, as discussed below.

There has been provided a method for the simultaneously increasing the variation effect, wherein the negative lens and the positive lens are both positioned at the iso-variation position, that is, $m- = m+ = -1$ so as to coincide the locus of Q— with the locus of P+. This technique was disclosed in Japanese Patent Publication Ser. No. 51-12424 as the so-called transferring system. However, this zooming system has the substantial disadvantage that the lens power of each lens group tends to be too strong to compensate for the various aberrations found in a wide zoom lens for a still camera, such as the wide angle zoom lens of the present invention. Because of this, the transferring system is not employed in the zoom lens of the present invention.

For the simultaneously increasing variation effect needed by the present invention, the following combination is considered in detail below:

Combination 1: the combination of regions A and C of FIGS. 3(a) and 3(b), respectively, and Combination 2: the combination of regions B and D of FIGS. 3(a) and 3(b), respectively.

The locuses of points Q— and P+ are coincident. That is, the coincident locus moves to the right in combination 1 and to the left in combination 2. In case of either combinations 1 or 2, the simultaneously increasing variation effect is attained.

The other combination that is considered is the combination of region A and D and the combination of region B and C. In this combination the variation ratio of the negative lens is increased and the variation ratio of the positive lens is decreased, and vice-versa, because of the moving direction of the locuses of Q— and P+. Such a combination thus produces a poor zoom effect.

In view of the above-described effect, the present invention provides a wide angle zoom lens system having a high zoom variation ratio by utilizing the combination 1 of regions A and C. However, if the combintion 2 of regions B and D is used, the lens power of each lens group is reduced and the overall length of the zoom lens system is increased. For these reasons, the combination 2 of regions B and C is unsuitable for the lens system of the present invention for providing the desired wide angle zoom capability.

The condition to produce the desired simultaneously increasing variation effect is derived as follows. When the image point of the positive lens resides in regions C and D, a higher increasing variation is obtained. Further, when the negative lens is moved in the region A, the negative lens changes from producing a variation increase to a variation decrease because of the turning point of the locus of P+ at $m+ = -1$. This variation decrease by the negative lens offsets the increasing variation effect of the positive lens. In order to avoid this, the locus of P— of the negative lens group, i.e., the second lens group, is modified as shown in FIG. 4 to produce a new turning point for the locus of Q—. As a result, the turning points P— and Q+ can be combined to obtain the simultaneously increasing variation effect.

As mentioned above, it is also possible to move the first lens group to produce the simultaneously increasing variation. This movement of the first lens group is represented by equation (1) given above. That is, by setting $k(f) = 1$ means that there is simultaneous movement of the first lens group and the third lens group, as illustrated in FIGS. 2(a) and 2(b). By setting $k(f) = 0$ means that the first lens group is fixed. In between the upper and lower limits of inequality of equation (1), k(f) is varied during the range defined by the inequality according to the variation of the focal length f. This is effective to produce the simultaneously increasing variation. Moreover, an additional movement is required other than the two independent movements necessary for the zoom lens system. Thus, in the process of obtaining optimum aberration compensation, more degrees of freedom are maintained, and particularly, this approach is effective to balance well the astigmatism due to the zooming function.

Exceeding the upper limit of the inequality of equation (1), however, causes an increase in the movement of the first lens group toward the object so that the overall length of the zoom lens is increased in the telescopic range of the zoom. In addition, the variation of the astigmatism due to zooming tends to be increased. Therefore, it is desirable to maintain k(f) less than the upper limit, as shown by equation (1).

If the lens construction includes as a fixed lens group the lens group III' having a positive focal length at either the image side or at the object side of the third lens group, the power of the third lens may be decreased. Further, if the lens group III' is arranged so as to be on the object side of the third lens group III, the width of the incidental light flux present on the third lens group is narrowed so that the variation of the aberration is prevented from being increased due to the deviation of the marginal light from the optical axis. If the lens group III' is arranged so as to be on the image side of the third lens group III, this is an effective approach for compensating for the spinning wheel shaped distortion aberration and the excessive magnification chromatic aberration due to the deviation of the marginal image focussing light from the optical axis in the telescopic range of the zoom. The existence of the lens group III' has little effect on the description of the present invention made with reference to FIGS. 3 and 4.

Conditions (2), (3), (4) and (5) relate to the application of the region A, as shown in FIGS. 3 and 4, and are required to realize the wide angle zoom capability of the present invention. Condition (2) must be met to maintain the appropriate amount of zoom variation. Condition (3) must be satisfied within the limits of condition (2) so as to activate the second lens group during the low magnification region A. The lower limit of condition (2) thereof is the limiting point for aberration compensation. The upper limit of condition (2) thereof is needed so as to prevent an increase in the amount of movement of the third lens group III. Above the upper limit of condition (4), it is difficult to compensate for aberrations because the lens power of the second group is more increased in order to use the low magnification region A. The condition (5) is required to maintain the moving space of the second and third lens groups for the purpose of high zoom variation ratio at the lower limit. The upper limit of condition (5) is effective to prevent the increase of the third lens group.

As described above, the essential aspects of the present invention have been presented and described. Next, several actual examples of the present invention are described.

In order from the object side to the image side of the zoom lens of the present invention, the first lens group I has a positive focal length $f_I$ and is composed of a negative lens having a strong negative lens power in the direction of the image and one or two positive lenses having a strong negative lens power in the direction of the object side. The negative lens of the first lens group I is cemented to the adjacent one of the positive lens. The Abbe number of the negative lens is $\nu_I$, and the negative value of the refractive indexes of the positive lenses in $n_I$.

The second lens group II has a negative focal length $f_{II}$ and is composed of a negative lens having a strong negative lens power in the direction of the image side and having a surface radius of curvature of $r_a$. The second lens group II also has a negative lens having a negative lens power to the direction of the image side and having a surface radius of curvature of $r_b$, and a positive lens having a positive lens power and a surface radius of curvature of $r_c$. The average of the Abbe numbers of the negative lenses is $\nu'_{IIN}$, and the Abbe number of the positive lens is $\nu_{IIP}$.

The third lens group III has a positive focal length $f_{III}$ and is composed of positive, negative and positive lens units. The positive lens unit on the object side includes two or three positive lenses. The middle negative lens unit includes a single negative lens having the negative power and surface radius of curvature of $r_d$. The other positive lens unit includes one or two positive lenses.

The lens system of the present invention satisfies the following conditions:

$$n_I > 1.65 \qquad (6)$$

$$\nu_I < 35 \qquad (7)$$

$$2r_a < r_b \qquad (8)$$

$$r_c < r_b \qquad (9)$$

$$\nu_{IIN} - \nu_{IIP} > 15 \qquad (10)$$

$$0.4 < r_d/f_s < 0.8 \qquad (11)$$

EXAMPLE 1

In the first example of the present invention, the first and third lens groups are integrally moved in an axial direction and the second lens group is independently moved. Example 1 satisfies the equation of $k(f) = 1.0$ of condition (1) during the entire zoom range.

With reference to FIG. 5, the zoom lens of the present invention in accordance with example 1 comprises ten lenses grouped in three lens groups. The first lens group lens has two lenses, with the first lens $L_1$ being a negative lens and with the second lens $L_2$ being a positive lens. The second group has three lens, with the third and fourth lenses $L_3$, $L_4$ being negative lenses and with the fifth lens $L_5$ being a positive lens. The third lens group has five lenses, with the sixth, seventh and eighth lenses $L_6$, $L_7$ and $L_8$ being positive lenses, with the ninth lens $L_9$ being a negative lens and with the tenth lens $L_{10}$ being a positive lens. The radii of curvature $r_1$ to $r_{19}$, the spacing or thickness $d_1$ to $d_{18}$, the refractive indices $n_1$ to $n_{10}$ and the Abbe numbers $\nu_1$ to $\nu_{10}$ of the lenses are given below.

| | | | overall focal length f = 36.0–83.0 viewing angle 2ω = 63.6°–28.2° | | |
|---|---|---|---|---|---|
| | Lens | radius of curvature | spacing and thickness | refractive index at d-line | Abbe No. |
| first lens group I | $L_1$ | $r_1 = 77.763$ $r_2 = 42.254$ | $d_1 = 2.00$ | $n_1 = 1.80518$ | $\nu_1 = 25.4$ |
| | $L_2$ | $r_3 = 391.376$ | $d_2 = 8.28$ | $n_2 = 1.81600$ | $\nu_2 = 46.6$ |
| | | | $d_3 = 0.950$–$14.980$–$27.033$ | | |
| second lens group II | $L_3$ | $r_4 = 156.329$ $r_5 = 21.510$ | $d_4 = 1.20$ | $n_3 = 1.88300$ | $\nu_3 = 40.8$ |
| | | | $d_5 = 10.61$ | | |
| | $L_4$ | $r_6 = -54.115$ $r_7 = 102.401$ | $d_6 = 1.11$ | $n_4 = 1.61800$ | $\nu_4 = 63.4$ |
| | | | $d_7 = 0.10$ | | |
| | $L_5$ | $r_8 = 45.372$ $r_9 = -209.533$ | $d_8 = 4.45$ | $n_5 = 1.76182$ | $\nu_5 = 26.6$ |
| | | | $d_9 = 27.980$–$13.950$–$1.897$ | | |
| third lens group III | $L_6$ | $r_{10} = 77.719$ $r_{11} = -254.167$ | $d_{10} = 2.65$ | $n_6 = 1.81600$ | $\nu_6 = 46.6$ |
| | | | $d_{11} = 0.57$ | | |
| | $L_7$ | $r_{12} = 30.925$ $r_{13} = 64.075$ | $d_{12} = 2.57$ | $n_7 = 1.80400$ | $\nu_7 = 46.6$ |
| | | | $d_{13} = 2.13$ | | |
| | $L_8$ | $r_{14} = 25.967$ $r_{15} = 69.262$ | $d_{14} = 4.36$ | $n_8 = 1.60311$ | $\nu_8 = 60.7$ |
| | | | $d_{15} = 1.06$ | | |
| | $L_9$ | $r_{16} = 319.085$ $r_{17} = 18.078$ | $d_{16} = 5.12$ | $n_9 = 1.84666$ | $\nu_9 = 23.9$ |
| | | | $d_{17} = 5.62$ | | |
| | $L_{10}$ | $r_{18} = 71.319$ $r_{19} = -34.849$ | $d_{18} = 4.50$ | $n_{10} = 1.50137$ | $\nu_{10} = 56.4$ |

-continued

| $f_S = 36.000$ | $n_I = 1.816$ |
|---|---|
| $f_I = 115.644$ | $\nu_I = 25.4$ |
| $f_{II} = -33.078$ | $r_a = r_5 = 21.510$ |
| $f_{III} = 38.952$ | $r_b = r_7 = 102.401$ |
| $l_{I,II} = 0.95$ | $r_c = r_8 = 45.372$ |
| $l_{II,III} = 27.98$ | $r_d = r_{17} = 18.078$ |
| | $\nu_{IIN} = 52.1$ |
| $k(f) = 1.0$ | $\nu_{IIP} = 26.6$ |

| focal length | back focal length | F number |
|---|---|---|
| 36.000 | 44.140 | 2.8 |
| 55.000 | 50.935 | 3.1 |
| 83.000 | 58.342 | 3.5 |

| focal length | variating coefficient of the first lens group I | variating coefficient of the second lens group II | variating coefficient of the third lens group III |
|---|---|---|---|
| 36.000 | 0 | −0.436 | −0.713 |
| 55.000 | 0 | −0.537 | −0.887 |
| 83.000 | 0 | −0.667 | −1.077 |

Figure 11A:
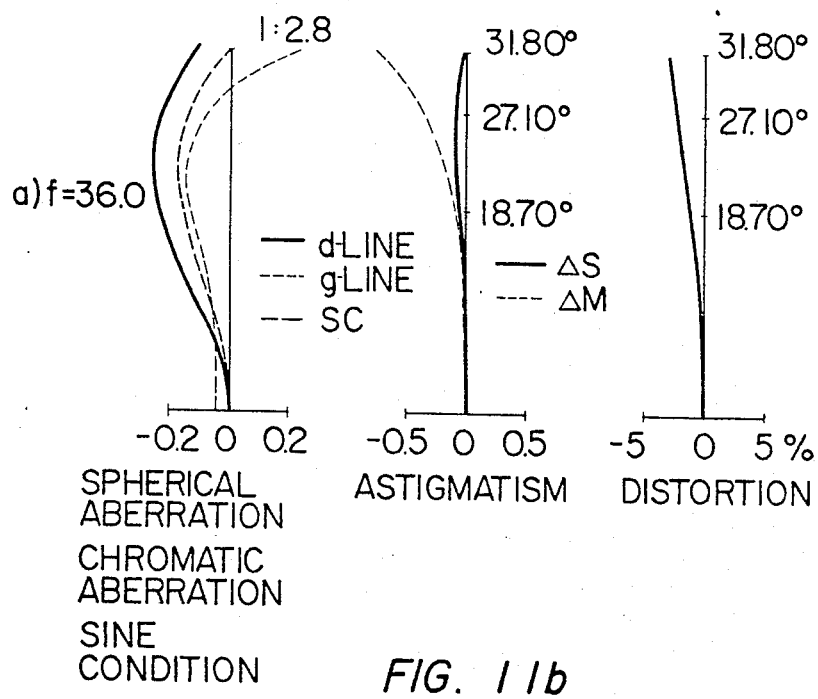
FIGS. 11a, 11b and 11c are graphs plotting the aberation curves obtained at the wide angle, middle angle, and narrow angle positions, respectively, of the zoom lens system constructed according to Example 1.
Figure 11B:
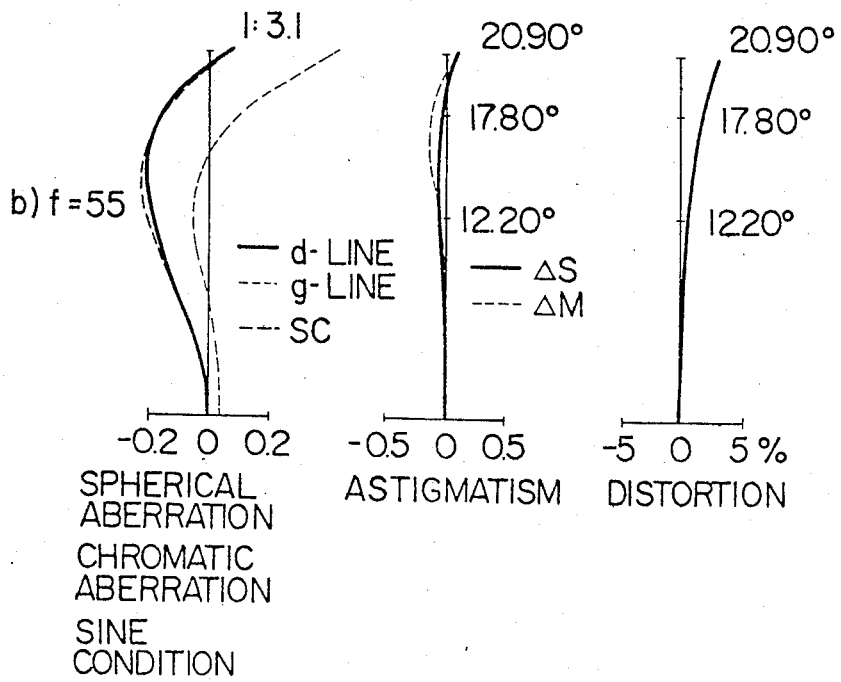
Figure 11C:
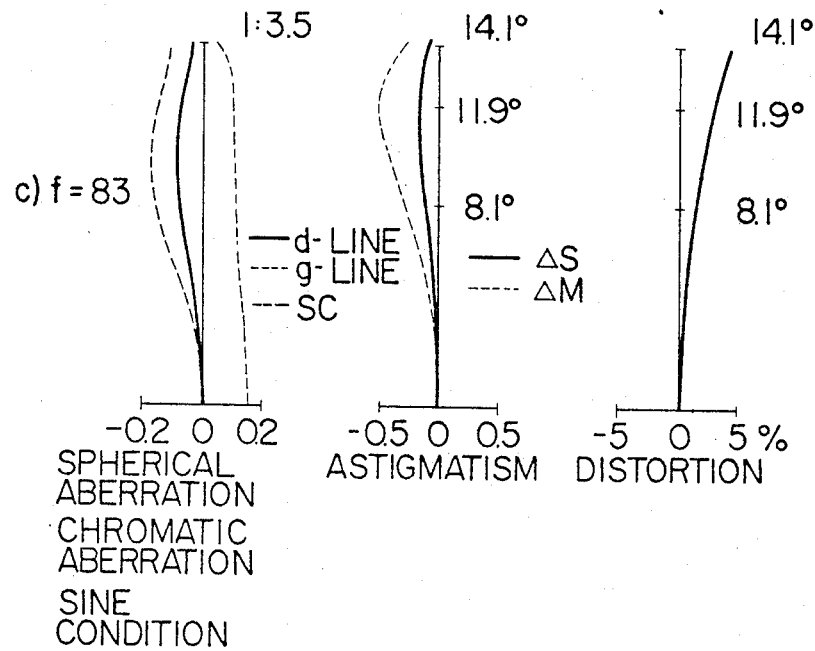

FIGS. 11A, 11B and 11C plot, respectively, the spherical and chromatic aberrations and sine condition, the astigmatism aberration, and the distortion aberration of the wide angle zoom lens system of Example 1 of the present invention at the wide angle position, the middle angle position, and the narrow angle position, respectively.

EXAMPLE 2

In the second example, the first, second and third lens groups are moved independently. In addition, the first lens group satisfies the inequality of condition (1) during the entire zoom range.

With reference to FIG. 6, the zoom lens system of the present invention in accordance with example 2 comprises eleven lenses grouped in three lens groups. The first lens group has three lenses, with the first lens $L_1$ being a negative lens and with the second and third lenses $L_2$, $L_3$ being positive lenses. The second group has three lenses, with the third and fourth lenses $L_3$, $L_4$ being negative lenses, and with the fifth lens $L_5$ being a positive lens. The third lens group has five lenses, with the sixth, seventh and eighth lenses $L_6$, $L_7$ and $L_8$ being positive lenses. The radii of curvature $r_1$ to $r_{21}$, the spacing or thickness $d_1$ to $d_{20}$, the refractive indices $n_1$ to $n_{11}$, and the Abbe numbers $\nu_1$ to $\nu_{11}$ of the lenses are given below.

overall focal length f = 35.996−82.997
viewing angle $2\omega = 64.2°-27.8°$

| | Lens | radius of curvature | spacing and thickness | refractive index at d-line | Abbe No. |
|---|---|---|---|---|---|
| first lens group I | $L_1$ | $r_1 = 3092.123$ | $d_1 = 1.60$ | $n_1 = 1.84666$ | $\nu_1 = 23.9$ |
| | | $r_2 = 104.769$ | $d_2 = 4.33$ | $n_2 = 1.81600$ | $\nu_2 = 46.6$ |
| | $L_2$ | $r_3 = -570.048$ | $d_3 = 0.16$ | | |
| | $L_3$ | $r_4 = 65.977$ | $d_4 = 4.49$ | $n_3 = 1.65160$ | $\nu_3 = 58.6$ |
| | | $r_5 = 2158.113$ | $d_5 = 0.980-13.236-19.746$ | | |
| second lens group II | $L_4$ | $r_6 = 11866.281$ | $d_6 = 1.45$ | $n_4 = 1.88300$ | $\nu_4 = 40.8$ |
| | | $r_7 = 21.855$ | $d_7 = 9.06$ | | |
| | $L_5$ | $r_8 = -45.651$ | $d_8 = 1.19$ | $n_5 = 1.61800$ | $\nu_5 = 63.4$ |
| | | $r_9 = 185.600$ | $d_9 = 0.10$ | | |
| | $L_6$ | $r_{10} = 48.905$ | $d_{10} = 3.40$ | $n_6 = 1.80518$ | $\nu_6 = 25.4$ |
| | | $r_{11} = -168.190$ | $d_{11} = 27.770-15.077-2.376$ | | |
| third lens group III | $L_7$ | $r_{12} = 125.990$ | $d_{12} = 2.28$ | $n_7 = 1.80400$ | $\nu_7 = 46.6$ |
| | | $r_{13} = -138.952$ | $d_{13} = 0.28$ | | |
| | $L_8$ | $r_{14} = 38.738$ | $d_{14} = 2.97$ | $n_8 = 1.80400$ | $\nu_8 = 46.6$ |
| | | $r_{15} = 118.930$ | $d_{15} = 0.10$ | | |
| | $L_9$ | $r_{16} = 26.088$ | $d_{16} = 3.11$ | $n_9 = 1.53172$ | $\nu_9 = 48.9$ |
| | | $r_{17} = 68.374$ | $d_{17} = 2.57$ | | |
| | $L_{10}$ | $r_{18} = -281.100$ | $d_{18} = 9.66$ | $n_{10} = 1.84666$ | $\nu_{10} = 23.9$ |
| | | $r_{19} = 21.464$ | $d_{19} = 1.89$ | | |

-continued $$L_{11} \begin{cases} r_{20} = 85.120 \\ r_{21} = -26.537 \end{cases} \quad d_{20} = 4.70 \quad n_{11} = 1.48749 \quad \nu_{11} = 70.1$$

$f_S = 35.996$  
$f_I = 90.975$  
$f_{II} = -30.243$  
$f_{III} = 37.871$  
$l_{I,II} = 0.980$  
$l_{II,III} = 27.770$ $n_f = 1.816$  
$\nu_f = 23.9$  
$r_a = r_7 = 21.855$  
$r_b = r_9 = 185.600$  
$r_c = r_{10} = 48.905$  
$r_d = r_{19} = 21.464$  
$\nu_{IIN} = 52.1$  
$\nu_{IIP} = 26.6$ k(f) is variable depending on f.
$k_{max} = k(35.996) = 1.61$
$k_{min} = k(82.997) = 0.59$

| focal length | back focal length | F number |
|---|---|---|
| 35.996 | 46.404 | 2.8 |
| 54.993 | 52.331 | 3.1 |
| 82.997 | 62.582 | 3.5 |

| focal length | variating coefficient of the first lens group I | variating coefficient of the second lens group II | variating coefficient of the third lens group III |
|---|---|---|---|
| 35.996 | 0 | −0.520 | −0.761 |
| 54.993 | 0 | −0.659 | −0.917 |
| 82.997 | 0 | −0.768 | −1.188 |

Figure 12A:
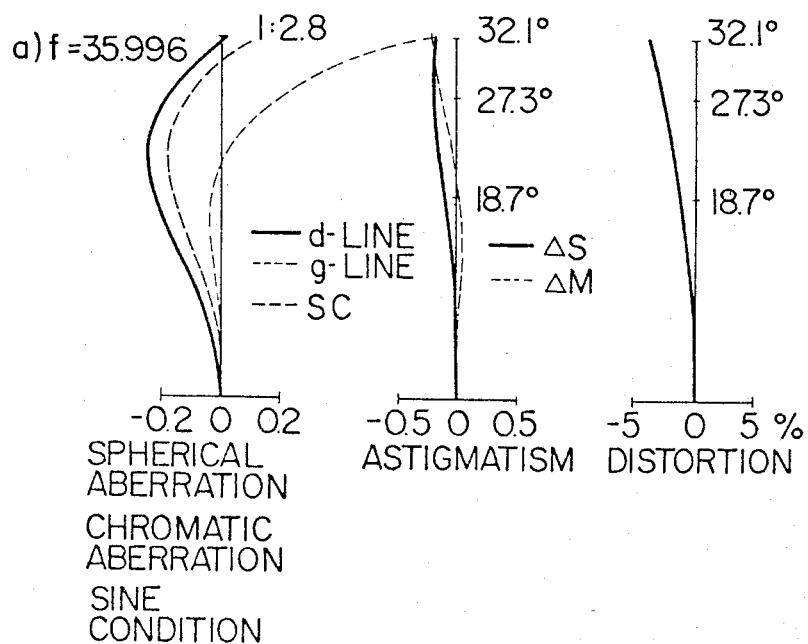
FIGS. 12a, 12b and 12c are graphs plotting the aberation curves obtained at the wide angle, middle angle, and narrow angle positions, respectively, of the zoom lens system constructed according to Example 2.
Figure 12B:
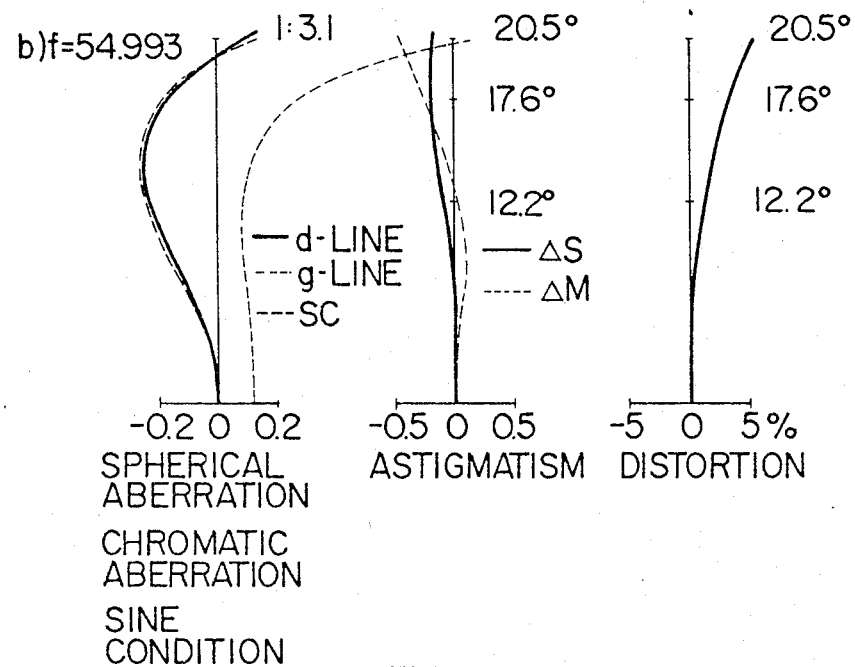
Figure 12C:
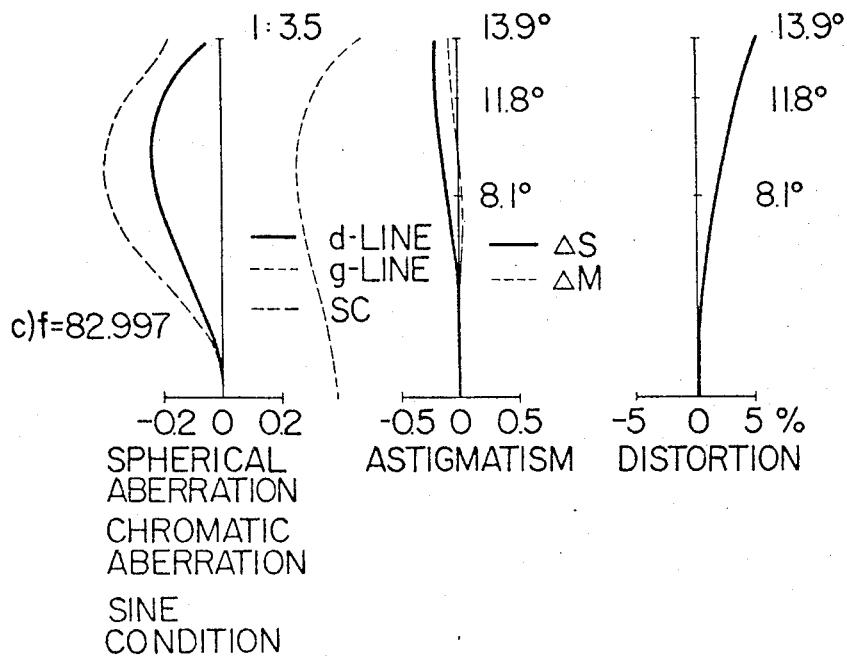

FIGS. 12A, 12B and 12C plot, respectively, the spherical and chromatic aberrations and sine condition, the astigmatism aberration, and the distortion aberration of the wide angle zoom lens system of Example 2 of the present invention at the wide angle position, the middle angle position, and the narrow angle position, respectively.

EXAMPLE 3

FIG. 7 shows a zoom lens system having the same overall structure as the zoom lens system of Example 2. However, this zoom lens system was constructed according to the following parameters:

| | Lens | radius of curvature | spacing and thickness | refractive index of d-line | Abbe No. |
|---|---|---|---|---|---|
| | | overall focal length f = 36.011–83.003 viewing angle 2ω = 64.8°–28.0° | | | |
| first lens group I | $L_1$ | $r_1 = 12988.0$ | $d_1 = 1.60$ | $n_1 = 1.84666$ | $\nu_1 = 23.9$ |
| | $L_2$ | $r_2 = 104.685$ | $d_2 = 4.49$ | $n_2 = 1.81600$ | $\nu_2 = 46.6$ |
| | | $r_3 = -395.931$ | $d_3 = 0.16$ | | |
| | $L_3$ | $r_4 = 45.751$ | $d_4 = 5.74$ | $n_3 = 1.58913$ | $\nu_3 = 61.1$ |
| | | $r_5 = 458.050$ | $d_5 = 1.090-11.360-15.283$ | | |
| second lens group II | $L_4$ | $r_6 = 9802.181$ | $d_6 = 1.45$ | $n_4 = 1.88300$ | $\nu_4 = 40.8$ |
| | | $r_7 = 20.159$ | $d_7 = 8.43$ | | |
| | $L_5$ | $r_8 = -40.152$ | $d_8 = 1.18$ | $n_5 = 1.61800$ | $\nu_5 = 63.4$ |
| | | $r_9 = 94.619$ | $d_9 = 0.10$ | | |
| | $L_6$ | $r_{10} = 45.094$ | $d_{10} = 3.68$ | $n_6 = 1.80518$ | $\nu_6 = 25.4$ |
| | | $r_{11} = -108.258$ | $d_{11} = 27.284-15.404-2.365$ | | |
| third lens group | $L_7$ | $r_{12} = -1335.144$ | $d_{12} = 2.02$ | $n_7 = 1.80400$ | $\nu_7 = 46.6$ |
| | | $r_{13} = -73.057$ | $d_{13} = 0.28$ | | |
| | $L_8$ | $r_{14} = 43.537$ | $d_{14} = 2.40$ | $n_8 = 1.80400$ | $\nu_8 = 46.6$ |
| | | $r_{15} = 155.661$ | $d_{15} = 0.10$ | | |
| | $L_9$ | $r_{16} = 24.992$ | $d_{16} = 4.31$ | $n_9 = 1.53172$ | $\nu_9 = 48.9$ |
| | | $r_{17} = 815.087$ | $d_{17} = 0.97$ | | |

-continued

| | | | | | |
|---|---|---|---|---|---|
| III | $L_{10}$ | $r_{18} = -137.003$ | $d_{18} = 10.44$ | $n_{10} = 1.84666$ | $\nu_{10} = 23.9$ |
| | | $r_{19} = 21.786$ | $d_{19} = 2.86$ | | |
| | $L_{11}$ | $r_{20} = 227.782$ | $d_{20} = 3.76$ | $n_{11} = 1.48749$ | $\nu_{11} = 70.1$ |
| | | $r_{21} = -25.281$ | | | |

$f_S = 36.011$  
$f_I = 74.097$  
$f_{II} = -26.819$  
$f_{III} = 37.067$  
$l_{I,II} = 1.090$  
$l_{II,III} = 27.284$ $n_I = 1.703$  
$\nu_I = 23.9$  
$r_a = r_7 = 20.159$  
$r_b = r_9 = 94.619$  
$r_c = r_{10} = 45.094$  
$r_d = r_{19} = 21.786$  
$\nu_{IIN} = 52.1$  
$\nu_{IIP} = 25.4$ $k(f)$ is varied depending on f.  
$k_{max} = k(36.2) = 1.32$  
$k_{min} = k(83.003) = 0.32$

| focal length | back focal length | F number |
|---|---|---|
| 36.011 | 46.721 | 2.8 |
| 55.055 | 51.478 | 3.1 |
| 83.003 | 62.583 | 3.5 |

| focal length | variating coefficient of the first lens group I | variating coefficient of the second lens group II | variating coefficient of the third lens group III |
|---|---|---|---|
| 36.011 | 0 | −0.622 | −0.782 |
| 55.055 | 0 | −0.815 | −0.911 |
| 83.003 | 0 | −0.926 | −1.210 |

Figure 13A:
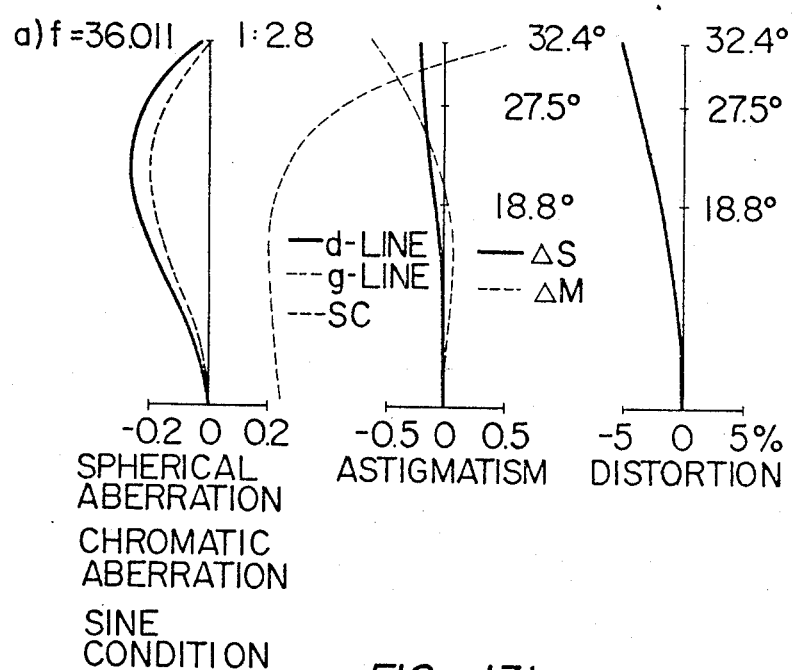
FIGS. 13a, 13b and 13c are graphs plotting the aberation curves obtained at the wide angle, middle angle, and narrow angle positions, respectively, of the zoom lens system constructed according to Example 3.
Figure 13B:
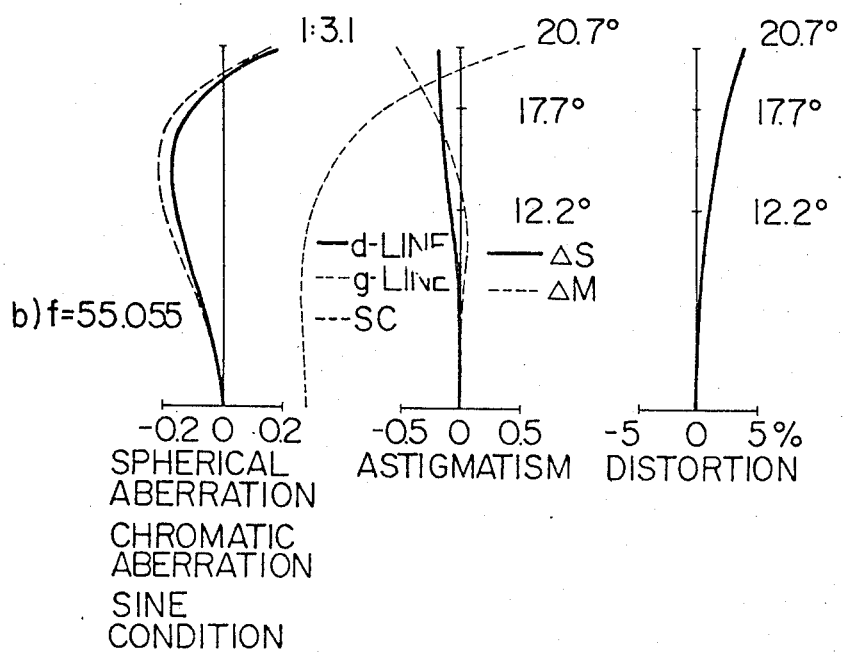
Figure 13C:
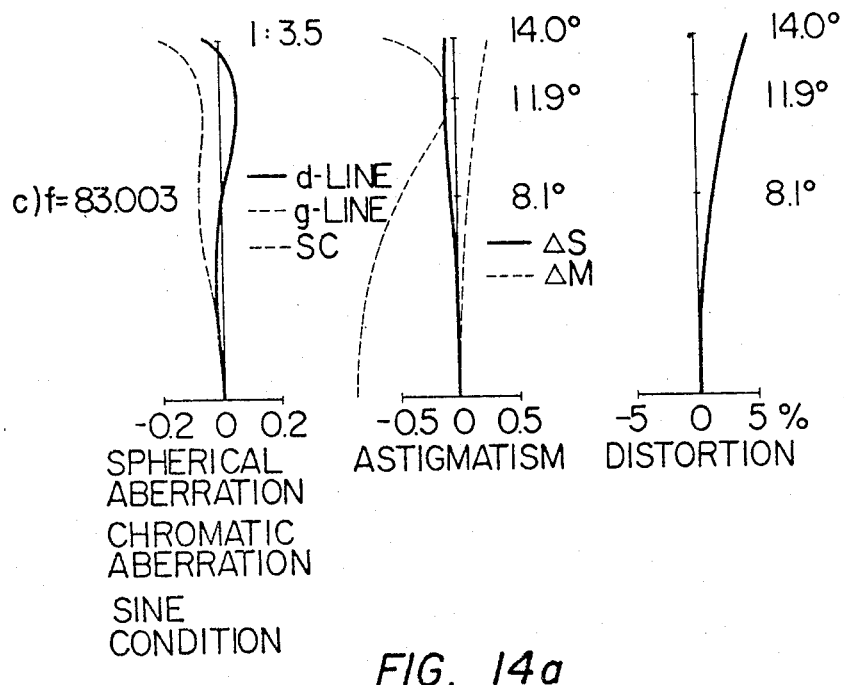

FIGS. 13A, 13B and 13C plot, respectively, the spherical and chromatic aberrations and sine condition, the astigmatism aberration, and the distortion aberration of the wide angle zoom lens system of Example 3 of the present invention at the wide angle position, the middle angle position and the narrow angle position, respectively.

EXAMPLE 4

FIG. 8 shows a zoom lens system having the same overall structure at the zoom lens system of Example 2 except that the first lens group only has two lenses. Specifically, with reference to FIG. 8, the zoom lens of the present invention in accordance with Example 4 comprises ten lenses grouped in three lens groups. The first lens group has two lenses, with the first lens $L_1$ being a negative lens and with the second lens $L_2$ being a positive lens. The second group has three lenses, with the third and fourth lenses $L_3$, $L_4$ being negative lenses, and with the fifth lens $L_5$ being a positive lens. The third lens group has five lenses, with the sixth, seventh and eighth lenses $L_6$, $L_7$ and $L_8$ being positive lenses, with the ninth lens $L_9$ being a negative lens and with the tenth lens $L_{10}$ being a positive lens. The radii of curvature $r_1$ to $r_{19}$, the spacing or thickness $d_1$ to $d_{18}$, the refractive indices $n_1$ to $n_{10}$ and the Abbe numbers $\nu_1$ to $\nu_{10}$ of the lenses are given below.

| | | | overall focal length f = 36.009–83.040 viewing angle $2\omega = 64.2°-28.4°$ | | |
|---|---|---|---|---|---|
| | Lens | radius of curvature | spacing and thickness | refractive index of d-line | Abbe No. |
| first lens group I | $L_1$ | $r_1 = 72.662$ | $d_1 = 2.00$ | $n_1 = 1.80518$ | $\nu_1 = 25.4$ |
| | | $r_2 = 40.993$ | $d_2 = 8.35$ | $n_2 = 1.81600$ | $\nu_2 = 46.6$ |
| | $L_2$ | $r_3 = 387.611$ | | | |
| | | | $d_3 = 0.496-12.246-18.987$ | | |
| second lens group II | $L_3$ | $r_4 = 222.420$ | $d_4 = 1.20$ | $n_3 = 1.86300$ | $\nu_3 = 41.5$ |
| | | $r_5 = 22.464$ | $d_5 = 11.33$ | | |
| | $L_4$ | $r_6 = -67.497$ | $d_6 = 1.40$ | $n_4 = 1.61800$ | $\nu_4 = 63.4$ |
| | | $r_7 = 66.399$ | $d_7 = 0.13$ | | |
| | $L_5$ | $r_8 = 42.414$ | $d_8 = 4.01$ | $n_5 = 1.76182$ | $\nu_5 = 26.6$ |
| | | $r_9 = -288.874$ | | | |
| | | | $d_9 = 29.437-14.256-0.473$ | | |
| | $L_6$ | $r_{10} = 57.417$ | $d_{10} = 2.37$ | $n_6 = 1.81600$ | $\nu_6 = 46.6$ |
| | | $r_{11} = -336.181$ | $d_{11} = 0.09$ | | |
| | $L_7$ | $r_{12} = 30.392$ | $d_{12} = 2.56$ | $n_7 = 1.80400$ | $\nu_7 = 46.6$ |
| | | $r_{13} = 65.991$ | | | |

-continued

| | | | | | |
|---|---|---|---|---|---|
| | | | $d_{13} = 2.48$ | | |
| third lens group III | $L_8$ | $r_{14} = 31.617$ | $d_{14} = 2.05$ | $n_8 = 1.64000$ | $\nu_8 = 60.1$ |
| | | $r_{15} = 73.034$ | $d_{15} = 1.19$ | | |
| | $L_9$ | $r_{16} = -1264.582$ | $d_{16} = 6.04$ | $n_9 = 1.84666$ | $\nu_9 = 23.9$ |
| | | $r_{17} = 19.660$ | $d_{17} = 6.00$ | | |
| | $L_{10}$ | $r_{18} = 109.201$ | $d_{18} = 4.50$ | $n_{10} = 1.54739$ | $\nu_{10} = 53.6$ |
| | | $r_{19} = -34.106$ | | | |

$f_S = 36.009$  $n_I = 1.816$
$f_I = 106.700$  $\nu_I = 25.4$
$f_{II} = -32.630$  $r_a = r_5 = 22.464$
$f_{III} = 39.840$  $r_b = r_7 = 66.399$
$l_{I,II} = 0.496$  $r_c = r_8 = 42.414$
$l_{II,III} = 29.437$  $r_d = r_{17} = 19.660$
  $\nu_{IIN} = 52.45$
  $\nu_{IIP} = 26.6$ k(f) is varied depending on f.
$k_{max} = k(36.009) = 1.07$
$k_{min} = k(83.040) = 0.44$

| focal length | back focal length | F number |
|---|---|---|
| 36.009 | 45.888 | 2.8 |
| 55.018 | 53.155 | 3.1 |
| 83.040 | 64.600 | 3.5 |

| focal length | variating coefficient of the first lens group I | variating coefficient of the second lens group II | variating coefficient of the third lens group III |
|---|---|---|---|
| 36.009 | 0 | −0.484 | −0.697 |
| 55.018 | 0 | −0.586 | −0.880 |
| 83.040 | 0 | −0.667 | −1.167 |

Figure 14A:
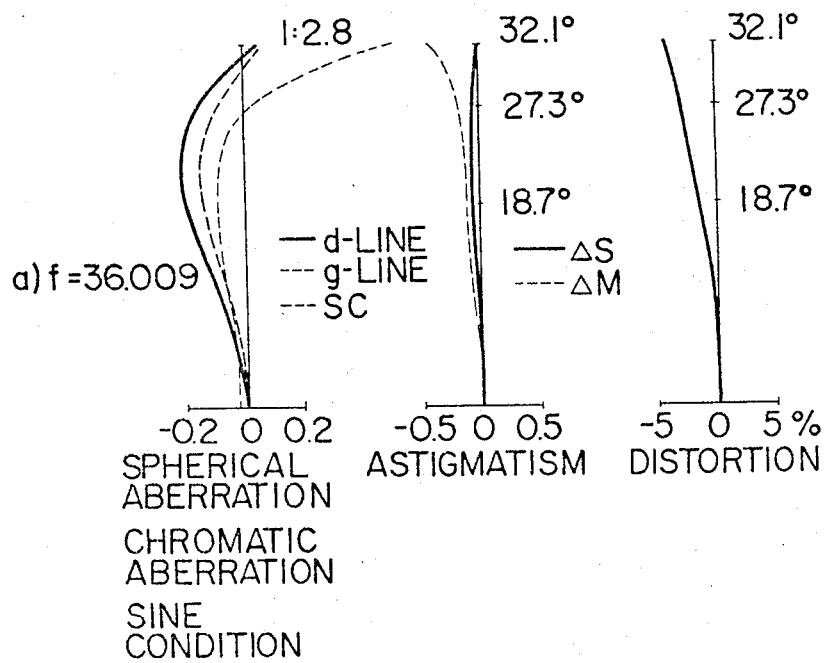
FIGS. 14a, 14b and 14c are graphs plotting the aberation curves obtained at the wide angle, middle angle, and narrow angle positions, respectively, of the zoom lens system constructed according to Example 4.
Figure 14B:
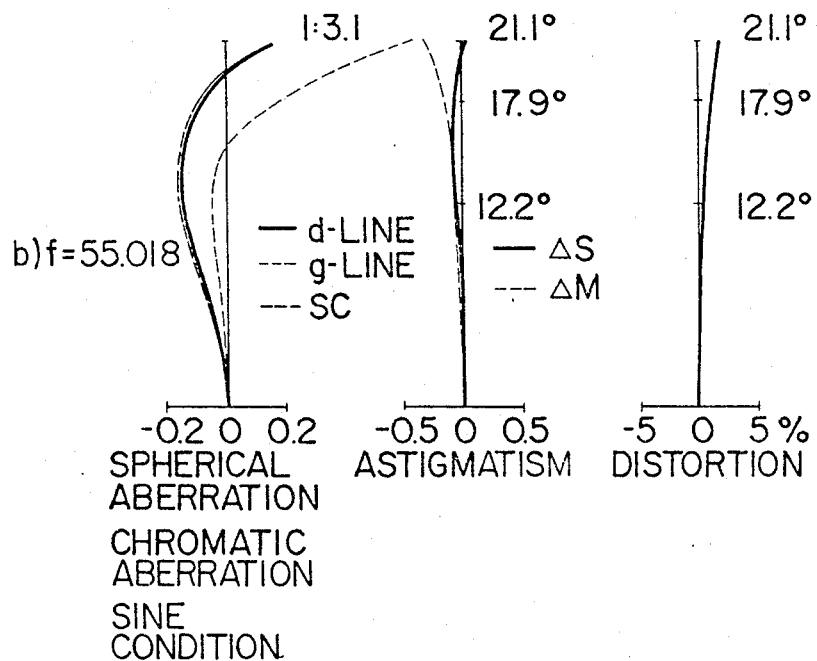
Figure 14C:
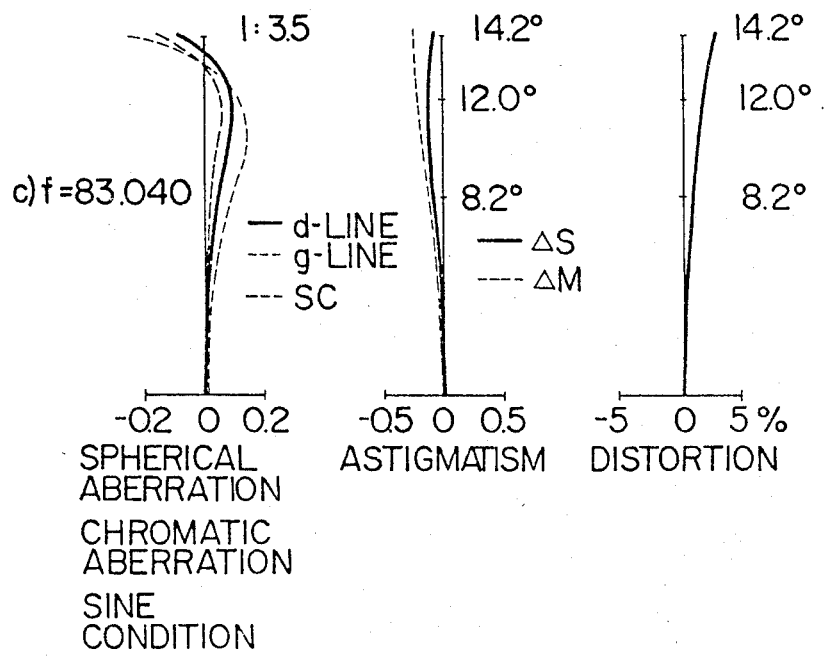

FIGS. 14A, 14B and 14C plot, respectively, the spherical and chromatic aberrations and sine condition, the astigmatism berration, and the distortion aberration of the wide angle zoom lens system of Example 4 of the present invention at the wide angle position, the middle angle position and the narrow angle position, respectively.

EXAMPLE 5

FIG. 9 shows the zoom lens system structure of Example 5. The zoom lens system in accordance with Example 5 includes a lens group III' in addition to the first lens group I, the second lens group II, and the third group III. The lens group III' is disposed along the optical axis between the second lens group II and the third lens group III. In other words, the lens group III' is disposed on the object side of the third lens group III. The lens group III' is fixed during the entire zoom range, while the second lens group II and the third lens group III are each independently moved in an axial direction Example 5 satisfies the equation of k(f)=0 of condition (1) during the entire zoom range, and also satisfies condition (12) shown below.

$$1.5 < f_{III}/f_S < 4.0 \qquad (12)$$

With reference to FIG. 9, the zoom lens system of the present invention in accordance with Example 5 comprises eleven lenses group in four lens groups. The first lens group I has two lenses, with the first lens $L_1$ being a negative lens and with the second lens $L_2$ being a positive lens. The second lens group II has three lenses, with the third and fourth lenses $L_3$, $L_4$ being negative lenses and with the fifth lens $L_5$ being a positive lens. The lens group III' has one lens, with the sixth lens $L_6$ being a positive lens. The third lens group III has five lenses, with the seventh, eighth and ninth lenses $L_7$, $L_8$ and $L_9$ being positive lenses, with the tenth lens $L_{10}$ being a negative lens and with the eleventh lens $L_{11}$ being a positive lens. The radii of curvature $r_1$ to $r_{21}$, the spacing or thickness $d_1$ to $d_{20}$, the refractive indices $n_1$ to $n_{11}$ and the Abbe numbers $\nu_1$ to $\nu_{11}$ of the lenses are given below.

| | lens | radius of curvature | spacing and thickness | refractive index at d-line | Abbe No. |
|---|---|---|---|---|---|
| | | overall focal length f = 28.978−77.5 viewing angle 2ω = 78.0°−30.0° | | | |
| first lens group I | $L_1$ | $r_1 = 42.227$ | $d_1 = 1.39$ | $n_1 = 1.84666$ | $\nu_1 = 23.9$ |
| | | $r_2 = 33.485$ | | | |
| | $L_2$ | | $d_2 = 7.28$ | $n_2 = 1.69680$ | $\nu_2 = 56.5$ |
| | | $r_3 = 208.250$ | | | |
| | | | $d_3 = 0.78-11.68-17.66$ | | |
| | $L_3$ | $r_4 = 131.553$ | $d_4 = 1.20$ | $n_3 = 1.88300$ | $\nu_3 = 40.8$ |
| | | $r_5 = 17.279$ | | | |
| | | | $d_5 = 7.02$ | | |

-continued

| | | | | | |
|---|---|---|---|---|---|
| second lens group II | $L_4$ | $r_6 = -76.950$ $r_7 = 42.130$ | $d_6 = 1.19$ $d_7 = 0.10$ | $n_4 = 1.81600$ | $\nu_4 = 46.6$ |
| | $L_5$ | $r_8 = 30.339$ $r_9 = -2221.231$ | $d_8 = 4.00$ $d_9 = 17.85\text{-}6.95\text{-}0.97$ | $n_5 = 1.80518$ | $\nu_5 = 25.4$ |
| lens group III' | $L_6$ | $r_{10} = 73.840$ $r_{11} = -248.553$ | $d_{10} = 3.84$ $d_{11} = 21.91\text{-}12.33\text{-}2.43$ | $n_6 = 1.74400$ | $\nu_6 = 44.7$ |
| third lens group III | $L_7$ | $r_{12} = 49.700$ $r_{13} = 245.000$ | $d_{12} = 1.61$ $d_{13} = 0.16$ | $n_7 = 1.81600$ | $\nu_7 = 46.6$ |
| | $L_8$ | $r_{14} = 35.991$ $r_{15} = -146.696$ | $d_{14} = 2.92$ $d_{15} = 1.14$ | $n_8 = 1.77250$ | $\nu_8 = 49.6$ |
| | $L_9$ | $r_{16} = -57.377$ $r_{17} = 27.625$ | $d_{16} = 11.02$ $d_{17} = 3.41$ | $n_9 = 1.80518$ | $\nu_9 = 25.4$ |
| | $L_{10}$ | $r_{18} = -65.656$ $r_{19} = -32.889$ | $d_{18} = 2.34$ $d_{19} = 0.10$ | $n_{10} = 1.84100$ | $\nu_{10} = 43.2$ |
| | $L_{11}$ | $r_{20} = -106.721$ $r_{21} = -46.694$ | $d_{20} = 2.32$ | $n_{11} = 1.81600$ | $\nu_{11} = 46.6$ |

$f_S = 28.978$
$f_l = 79.546$
$f_{II} = -20.995$
$f_{III} = 46.512$
$f_{III'} = 76.907$
$l_{I.II} = 0.78$
$l_{II.III} = 43.60$ $n_I = 1.69680$
$\nu_I = 23.9$
$r_a = r_5 = 17.279$
$r_b = r_7 = 42.13$
$r_c = r_8 = 30.339$
$r_d = r_{17} = 27.625$
$\nu_{IIN} = 43.7$
$\nu_{IIP} = 25.4$ $k(f) = 0$

| focal length | back focal length | F number |
|---|---|---|
| 28.978 | 42.182 | 4.5 |
| 50.0 | 51.761 | 4.5 |
| 77.5 | 61.667 | 4.5 |

| focal length | variating coefficient of the first lens groups I | variating coefficient of the second lens group II | variating coefficient of the third lens groups III |
|---|---|---|---|
| 28.978 | 0 | −0.418 | −0.217 |
| 50.0 | 0 | −0.534 | −0.423 |
| 77.5 | 0 | −0.629 | −0.636 |

Figure 15A:
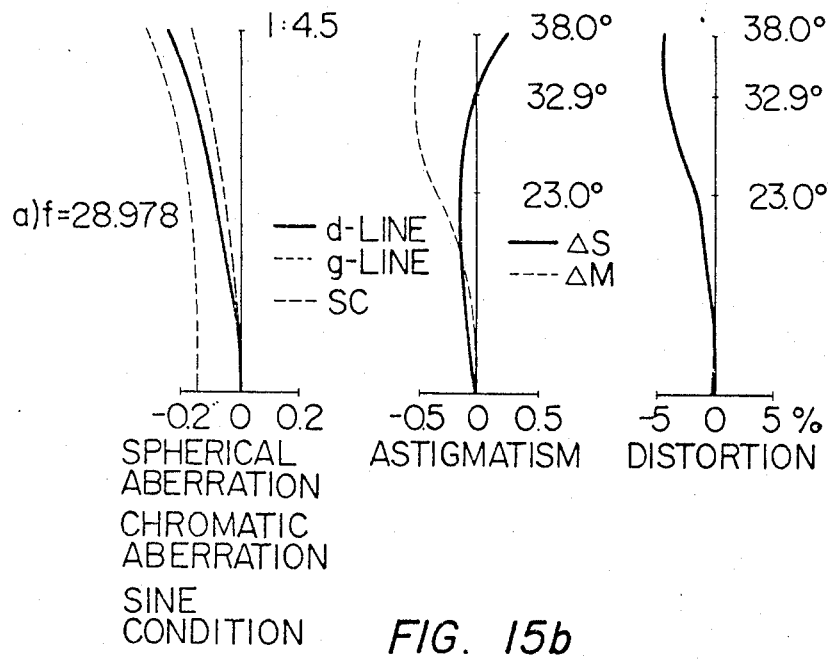
FIGS. 15a, 15b and 15c are graphs plotting the aberation curves obtained at the wide angle, middle angle, and narrow angle positions, respectively, of the zoom lens system constructed according to Example 5.
Figure 15B:
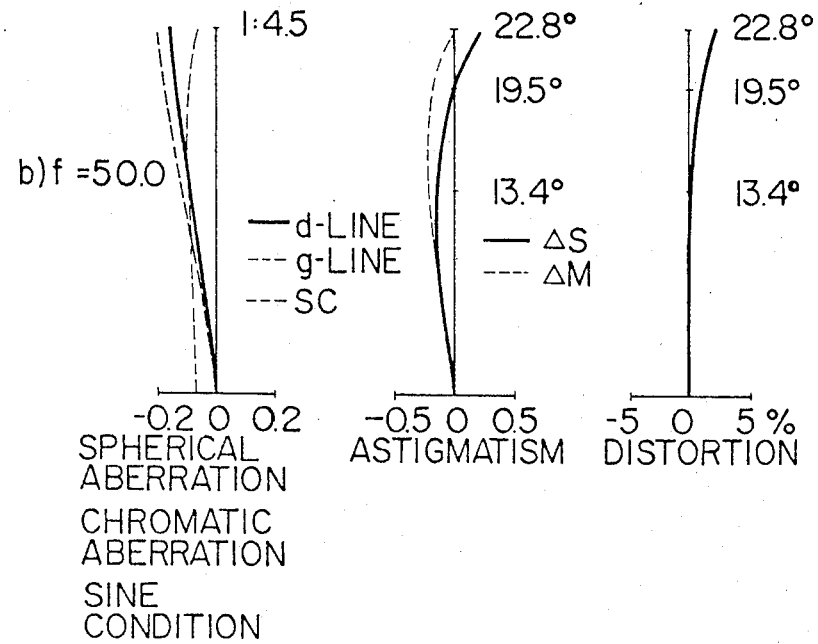
Figure 15C:
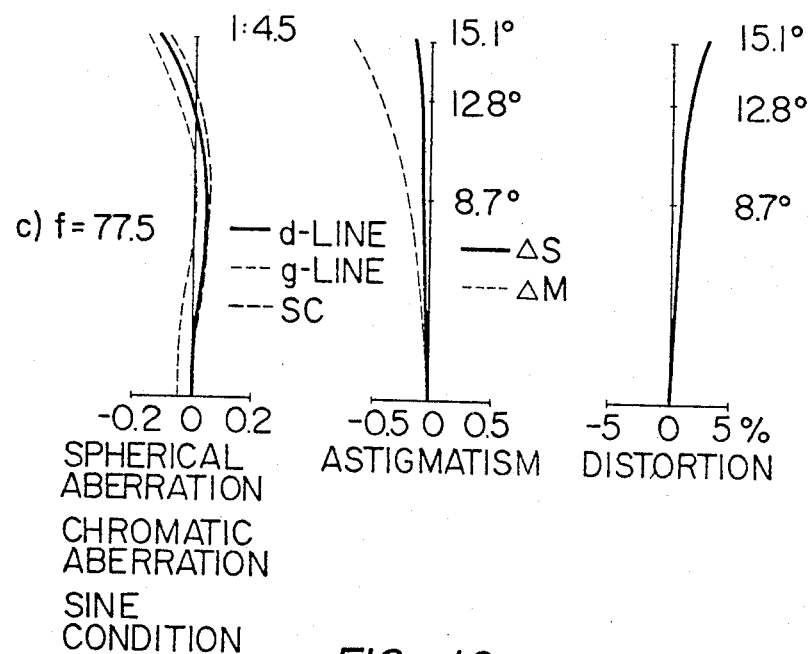

FIGS. 15A, 15B and 15C plot, respectively, the spherical and chromatic aberrations and sine condition, the astigmatism aberration, and the distortion aberration of the wide angle zoom lens system of Example 5 of the present invention at the wide angle position, the middle angle position and the narrow angle position, respectively.

EXAMPLE 6

Figure 10:
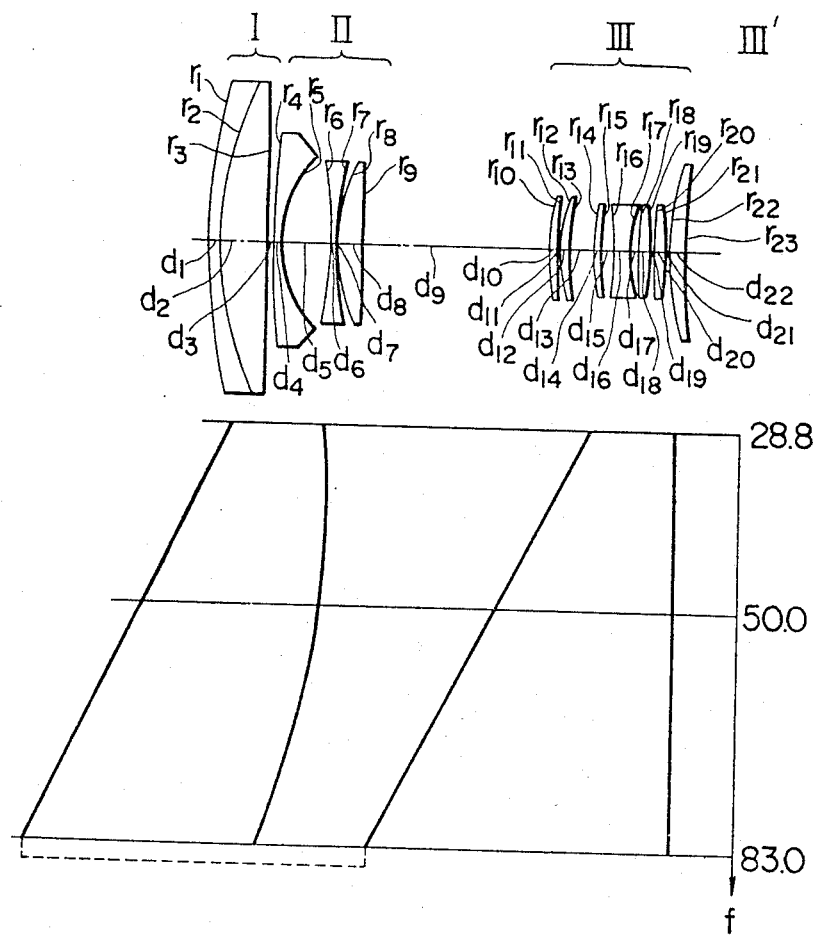
FIG. 10 is a simplified cross-sectional view of the wide angle zoom lens system according to Example 6 of the present invention.

FIG. 10 shows the zoom lens system structure of Example 6. The zoom lens system in accordance with Example 6 includes a lens group III' in addition to the first lens group I, the second lens group II, and the third lens group III. The lens group III' is disposed along the optical axis on the image side of the third lens group III. The first lens group I and the third lens group III are integrally moved in an axial direction and the second lens group is independently moved. Example 6 satisfies the equation of $k(f) = 1.0$ of condition (1) during the entire zoom range. Lens group III' has a positive focal length $f_{III'}$. On the image side of the third lens group III, the following condition must be satisfied.

$$3.5 < f_{III'}/f_S < 10.0 \tag{13}$$

With reference to the first lens group I, because the various aberrations generated therein vary greatly during the zooming range due to the large increasing zoom variation effect of the lens groups in the direction of the image after the first lens group I, the various aberration generated by the first lens group I must be minimized. The various aberrations are minimized as follows. First, the negative lens is properly positioned. Then, in accordance with condition (6), the residual secondary spectrum is minimized at the chromatic aberration compensation point in the overall lens system. Then condition (7) is used to minimize the variation of the astigmatism and chromatic aberrations.

With respect to the second lens group II, a balance must be made between the large increasing variation effect which requires the second lens group II to have a strong negative lens power, and the minimization of aberration generation. The required balance is made by arranging lenses in the second lens group II such that the negative and positive ones satisfy conditions (8) and (9) given above, which results in the spherical aberration generation being kept at a low level. Condition (9) especially must be satisfied because it relates to undercompensation for spherical aberration in the lens surfaces of the positive lenses facing in the direction of the object and prevents the chromatic aberration from being generating in telescopic portion of the zoom range. The negative power of the lenses, however, which tends to be insufficient, is compensated for by loading a negative power to the image side surface of the negative lens facing in the direction of the object in accordance with condition (8) so as to balance the astigmatism and the distortion during the overall zoom range. When condition (10) is satisfied, the chromatic aberration generated in the second lens group II is minimized.

With respect to the third lens group III, the variation of the spherical aberration due to zooming can be prevented because the positive lens group is provided on the object side. The negative-astigmatism generated in the positive lens unit is eliminated by the negative lens unit disposed adjacent the positive lens unit. The negative-astigmatism elimination is most effectively achieved by determining the configuration of the negative lens unit such that it satisfies condition (11) shown above. Moreover, aberration compensation produced by the positive lens unit positioned on the image side of the negative lens unit is effecitvely achieved in the region above the lower limit of condition (11). The distortion and astigmatism are well balanced by the appropriate positioning of the final positive lens unit.

Because lens group III′, having a positive focal length $f_{III'}$, and satisfying condition (11) given above, is arranged on the image side of the third lens group III, the distortion and the image distortion aberration are well balanced throughout the entire zoom range.

With reference to FIG. 10, the zoom lens system of the present invention in accordance with Example 6 comprises twelve lens grouped in four lens groups. The first lens group I has two lenses, with the first lens $L_1$ being a negative lens and with the second lens $L_2$ being a positive lens. The second lens group II has three lenses, with the third and fourth lenses $L_3$, $L_4$ being negative lenses and with the fifth lens $L_5$ being a positive lens. The third lens group III has a first positive lens group, a negative lens group, and a second positive lens group, in the order from the object side to the image side. The first positive lens group has three lenses, with the sixth, seventh and eighth lenses $L_6$, $L_7$, $L_8$ all being positive lenses. The negative lens group has one lens, with the ninth lens $L_9$ being a negative lens. The second positive lens group has two lenses, with the tenth and eleventh lenses $L_{10}$, $L_{11}$ both being positive lenses. The lens group III′ has one lens, with the twelfth lens $L_{12}$ being a positive lens. The radii of curvature $r_1$ to $r_{23}$, the spacing or thickness $d_1$ to $d_{22}$, the refractive indices $n_1$ to $n_{12}$ and the Abbe numbers $\nu_1$ to $\nu_{12}$ of the lenses are given below.

| | | overall focal length f = 28.80–83.00 viewing angle 2ω = 76.2–28.6 | | | |
|---|---|---|---|---|---|
| | lens | radius of curvature | spacing and thickness | refractive index at d-line | Abbe No. |
| first lens group I | $L_1$ | $r_1 = 98.268$ | $d_1 = 2.00$ | $n_1 = 1.80518$ | $\nu_1 = 25.4$ |
| | | $r_2 = 56.851$ | | | |
| | $L_2$ | | $d_2 = 8.06$ | $n_2 = 1.81600$ | $\nu_2 = 46.8$ |
| | | $r_3 = 7200.000$ | | | |
| | | | $d_3 = 0.98$–9.37–27.63 | | |
| second lens group II | $L_3$ | $r_4 = 128.547$ | $d_4 = 1.20$ | $n_3 = 1.86300$ | $\nu_3 = 41.7$ |
| | | $r_5 = 18.176$ | | | |
| | | | $d_5 = 8.89$ | | |
| | $L_4$ | $r_6 = -75.123$ | $d_6 = 1.40$ | $n_4 = 1.61800$ | $\nu_4 = 63.4$ |
| | | $r_7 = 62.479$ | | | |
| | | | $d_7 = 0.10$ | | |
| | $L_5$ | $r_8 = 33.000$ | $d_8 = 3.89$ | $n_5 = 1.76182$ | $\nu_5 = 26.6$ |
| | | $r_9 = 2639.805$ | | | |
| | | | $d_9 = 32.08$–23.69–5.43 | | |
| third lens group III | $L_6$ | $r_{10} = 38.025$ | $d_{10} = 1.80$ | $n_6 = 1.81600$ | $\nu_6 = 46.8$ |
| | | $r_{11} = 126.500$ | | | |
| | | | $d_{11} = 0.10$ | | |
| | $L_7$ | $r_{12} = 23.370$ | $d_{12} = 1.87$ | $n_7 = 1.80400$ | $\nu_7 = 46.6$ |
| | | $r_{13} = 40.949$ | | | |
| | | | $d_{13} = 3.54$ | | |
| | $L_8$ | $r_{14} = 27.773$ | $d_{14} = 1.78$ | $n_8 = 1.64000$ | $\nu_8 = 60.2$ |
| | | $r_{15} = 63.990$ | | | |
| | | | $d_{15} = 1.50$ | | |
| | $L_9$ | $r_{16} = -505.700$ | $d_{16} = 2.78$ | $n_9 = 1.84666$ | $\nu_9 = 23.9$ |
| | | $r_{17} = 18.425$ | | | |
| | | | $d_{17} = 2.02$ | | |
| | $L_{10}$ | $r_{18} = 206.849$ | $d_{18} = 1.80$ | $n_{10} = 1.55361$ | $\nu_{10} = 51.2$ |
| | | $r_{19} = -55.409$ | | | |
| | | | $d_{19} = 0.50$ | | |
| | $L_{11}$ | $r_{20} = 755.310$ | $d_{20} = 1.80$ | $n_{11} = 1.59270$ | $\nu_{11} = 35.3$ |
| | | $r_{21} = -60.691$ | | | |

-continued

| | | $r_{22} = 52.200$ | $d_{21} = 1.09-8.22-36.95$ | | |
|---|---|---|---|---|---|
| lens group III' | $L_{12}$ | $r_{23} = 102.000$ | $d_{22} = 2.50$ | $n_{12} = 1.58144$ | $v_{12} = 40.7$ |

$f_S = 28.80$     $n_I = 1.816$
$f_I = 120.875$     $v_I = 25.4$
$f_{II} = -29.842$     $r_a = r_5 = 18.176$
$f_{III} = 40.170$     $r_b = r_7 = 62.479$
$f_{III'} = 180.548$     $r_c = r_8 = 33.000$
$l_{I.II} = 0.98$     $r_d = r_{17} = 18.425$
$l_{II.III} = 28.54$     $v_{IIN} = 52.5$
    $v_{IIP} = 26.6$
$k(f) = 1.0$

| focal length | back focal length | F number |
|---|---|---|
| 28.80 | 41.856 | 3.5 |
| 50.00 | 41.856 | 4.4 |
| 83.00 | 41.856 | 5.4 |

| focal length | variating coefficient of the first lens group I | variating coefficient of the second lens group II | variating coefficient of the third lens group III |
|---|---|---|---|
| 28.80 | 0 | −0.349 | −0.907 |
| 50.00 | 0 | −0.407 | −1.291 |
| 83.00 | 0 | −0.508 | −1.800 |

Figure 16A:
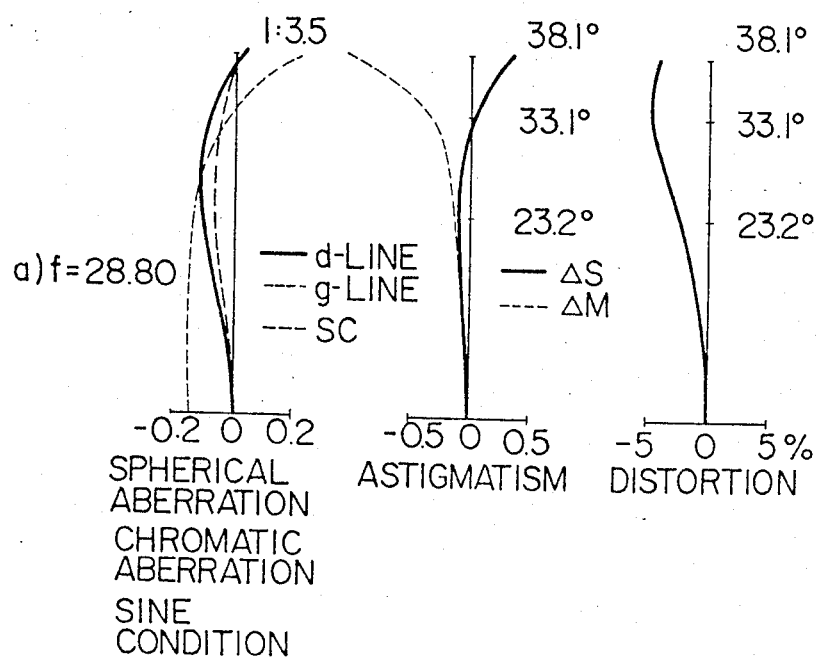
FIGS. 16a, 16b and 16c are graphs plotting the aberation curves obtained at the wide angle, middle angle, and narrow angle positions, respectively, of the zoom lens system constructed according to Example 6.
Figure 16B:
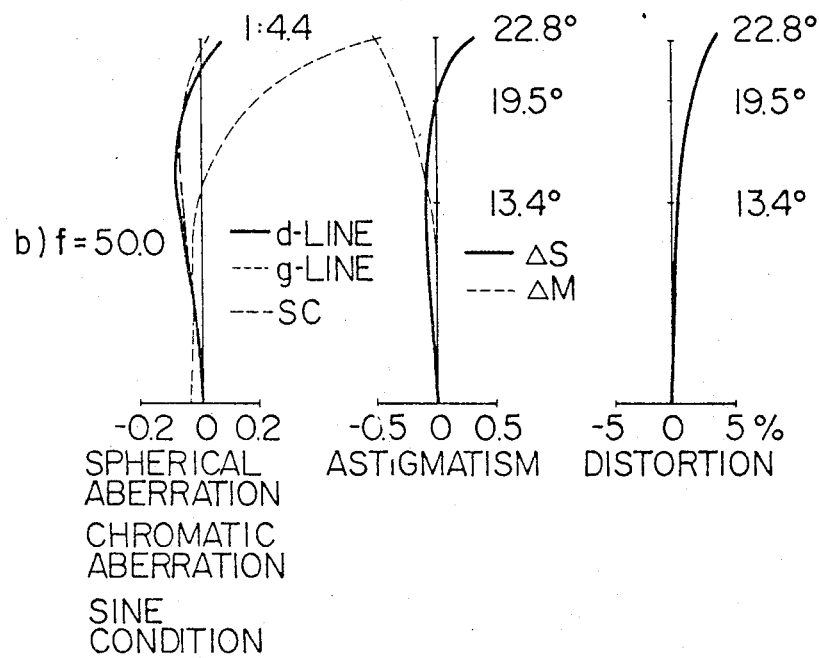
Figure 16C:
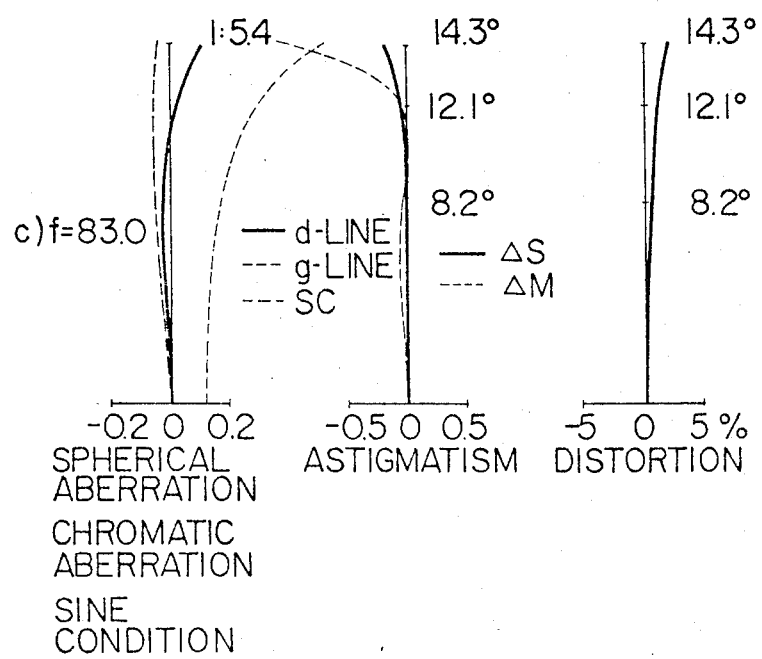

FIGS. 16A, 16B and 16C plot, respectively, the spherical and chromatic aberrations and sine condition, the astigmatism aberration, and the distortion aberration of the wide angle zoom lens system of Example 6 of the present invention at the wide angle position, the middle angle position, and the narrow angle position, respectively.

As stated above, the use of the lens group III' in the zoom lens system of the present invention produces the following beneficial effects. It should be recalled that lens group III' has a positive focal length $f_{III'}$ and satisfies condition (11). With respect to Example 5 where the lens group III' is disposed on the object side of the third lens group III, lens group III results in the minimization of spherical aberration throughout the entire zoom range. With respect to Example 6 where the lens group III' is disposed on the image side of the third lens group III, lens group III results in a balancing of the distortion with the image distortion aberration throughout the entire zoom range.

The present invention as described above can be characterized as having four embodiments, with Example 1 corresponding to the first embodiment, with Examples 2, 3 and 4 corresponding to the second embodiment, with Example 5 corresponding to third embodiment, and with Example 6 corresponding to the fourth embodiment.

What is claimed is:

1. A wide angle zoom lens system exhibiting a high variation zoom ratio, said wide angle zoom lens system comprising in order from the object side a first lens group I having a positive focal length $f_I$, a second lens group II having a negative focal length $f_{II}$, a third lens group III having a positive focal length $f_{III}$, said second lens group II and said third lens group III being axially movable along the optical axis so that each produces a component of said increasing variation effect, characterized by:

(a) the amount of axial movement $X_I(f)$ of the first lens group I and the amount of axial movement $X_{III}(f)$ of the third lens group III satisfying the following conditions:

$$X_I(f) = k(f) \cdot X_{III}(f), \text{ and} \tag{1}$$

$$0 \leq k(f) \leq 3.0; \tag{2}$$

(b) the lens system having a high zoom variation ratio equal to or greater than 2 times; and, (c) the lens system satisfying the following conditions:

$$1.70 < f_I/f_S < 5.0 \tag{3}$$

$$0.60 < |f_{II}|/f_S < 1.50 \tag{4}$$

$$0 < l_{I.II}/f_S < 0.2 \tag{5}$$

$$0.6 < l_{II.III}/f_S < 1.8 \tag{6}$$

wherein:
$f_S$ is the overall focal length at the wide angle position;
$l_{I.II}$ is the aerial space between the first lens group I and the second lens group II at the wide angle position; and
$l_{II.III}$ is the aerial space between the second lens group II and the third lens group III at the wide angle position.

2. The wide angle zoom lens system as recited in claim 1, further comprising a lens group III', said lens group III' having a positive focal length $f_{III'}$, said lens group III' being fixed along the optical axis so as not to be movable during zooming, and said lens group III' being disposed on the object side of said third lens group III.

3. The wide angle zoom lens system as recited in claim 1, further comprising a lens group III', said lens group III' having a positive focal length $f_{III'}$, said lens group III' being fixed along the optical axis so as not to be movable during zooming, and said lens group III' being disposed on the image side of said third lens group III.

4. A wide angle zoom lens system exhibiting a high variation zoom ratio, grouped in first, second and third lens groups I, II and III, in order from the object side to the image side, said first lens group I having a positive focal length $f_I$, said first lens group I having at least two lenses, with the first lens being a negative lens having a strong negative lens power in the image direction and with said second lens and any additional lenses being positive lenses, said first lens being optically cemented to said second lens, said second lens group II having a negative focal length $f_{II}$, said second lens group II having at least three lenses, with the first lens being a negative lens having a strong negative lens power on the image side surface, with the second lens being a negative lens having a negative lens power on the image side surface, and with the third lens being a positive lens having a positive lens power on the object side surface, said third lens group III having a positive focal length $f_{III}$ and having at least four lenses, said lenses in order from the object side to the image side divided into a first positive lens unit, a negative lens unit and a second positive lens unit, said first positive lens unit having at least two positive lenses, said negative lens unit having a negative lens, and said second positive lens unit having at least one positive lens, wherein said second lens group II and said third lens group III are each independently moved for zooming, the lens system satisfying the following conditions:

$X_I(f) = k(f) X_{III}(f)$     (1)

$0 \leq k(f) \leq 3.0$     (2)

$1.7 < f_I/f_S < 5.0$     (3)

$0.6 < |f_{II}|/f_S < 1.5$     (4)

$n_I > 1.65$     (5)

$\nu_I < 35$     (6)

$2r_a < r_b$     (7)

$r_c < r_b$     (8)

$\nu_{IIN} - \nu_{IIP} > 15$     (9)

$0.4 < r_d/f_{III} < 0.8$     (10)

wherein:
- $X_I(f)$ is the amount of axial movement of the first lens group I;
- $X_{III}(f)$ is the amount of axial movement of the third lens group III;
- $f_S$ is the overall focal length at the wide angle position;
- $n_I$ is the average value of the refractive indices of the positive lenses in the first lens group I;
- $\nu_I$ is the Abbe number of the negative lens in the first lens group I;
- $r_a$ is the radius of curvature in the image direction of the first lens of the second lens group II;
- $r_b$ is the radius of curvature in the image direction of the second lens of the second lens group II;
- $r_c$ is the radius of curvature in the object direction of the third lens of the second-lens group II;
- $\nu_{IIN}$ is the average of the Abbe numbers of the first and second lenses of the second lens group II;
- $\nu_{IIP}$ is the Abbe number of the third lens of the second lens group II; and
- $r_d$ is the radius of curvature in the image direction of the negative lens unit of said third lens group III.

5. The wide angle zoom lens system as recited in claim 4, further comprising a lens group III′, said lens group III′ having a positive focal length $f_{III'}$, said lens groups III′ being fixed along the optical axis so as not to be movable during zooming, said lens group III′ being disposed on the object side of said third lens group III, and wherein said third lens group includes a single positive lens and satisfies the following condition:

$1.5 < f_{III'}/f_S < 4.0$.

6. The wide angle zoom lens system as recited in claim 4, further comprising a lens group III′, said lens group III′ having a positive focal length $f_{III'}$, said lens group III′ being fixed along the optical axis so as not to be movable during zooming, said lens group III′ being disposed on the image side of said third lens group III, and wherein said third lens group includes a single positive lens and satisfies the following condition:

$3.5 < f_{III'}/f_S < 10.0$.

7. The wide angle zoom lens system as recited in claim 1, wherein said zoom lens system comprises ten lenses grouped in three lens groups, in order from the object side to the image side, the first lens group lens having two lenses, with the first lens $L_1$ being a negative lens and with the second lens $L_2$ being a positive lens, the second group having three lenses, with the third and fourth lenses $L_3$, $L_4$ being negative lenses and with the fifth lens $L_5$ being a positive lens, and the third lens group having five lenses, with the sixth, seventh and eighth lenses $L_6$, $L_7$ and $L_8$ being positive lenses, with the ninth lens $L_9$ being a negative lens and with the tenth lens $L_{10}$ being a negative lens, wherein the radii of curvature $r_1$ to $r_{19}$, the spacing or thickness $d_1$ to $d_{18}$, the refractive indices $n_1$ to $n_{10}$ and the Abbe numbers $\nu_1$ to $\nu_{10}$ of the lenses are as follows:

| | | | overall focal length f = 36.0–83.0 | | |
| | | | viewing angle 2ω = 63.6°–28.2° | | |
| Abbe No. | Lens | radius of curvature | spacing and thickness | refractive index at d-line | |
| --- | --- | --- | --- | --- | --- |
| first lens group I | $L_1$ | $r_1 = 77.763$ | $d_1 = 2.00$ | $n_1 = 1.80518$ | $\nu_1 = 25.4$ |
| | | $r_2 = 42.254$ | | | |
| | $L_2$ | | $d_2 = 8.28$ | $n_2 = 1.81600$ | $\nu_2 = 46.6$ |
| | | $r_3 = 391.376$ | | | |
| | | | $d_3 = 0.950$–14.980–27.033 | | |
| | $L_3$ | $r_4 = 156.329$ | $d_4 = 1.20$ | $n_3 = 1.88300$ | $\nu_3 = 40.8$ |
| | | $r_5 = 21.510$ | | | |
| | | | $d_5 = 10.61$ | | |

-continued

| | | radius of curvature | spacing and thickness | refractive index | Abbe No. |
|---|---|---|---|---|---|
| second lens group II | $L_4$ | $r_6 = -54.115$<br>$r_7 = 102.401$ | $d_6 = 1.11$<br>$d_7 = 0.10$ | $n_4 = 1.61800$ | $\nu_4 = 63.4$ |
| | $L_5$ | $r_8 = 45.372$<br>$r_9 = -209.533$ | $d_8 = 4.45$<br>$d_9 = 27.980\text{-}13.950\text{-}1.897$ | $n_5 = 1.76182$ | $\nu_5 = 26.6$ |
| third lens group III | $L_6$ | $r_{10} = 77.719$<br>$r_{11} = -254.167$ | $d_{10} = 2.65$<br>$d_{11} = 0.57$ | $n_6 = 1.81600$ | $\nu_6 = 46.6$ |
| | $L_7$ | $r_{12} = 30.925$<br>$r_{13} = 64.075$ | $d_{12} = 2.57$<br>$d_{13} = 2.13$ | $n_7 = 1.80400$ | $\nu_7 = 46.6$ |
| | $L_8$ | $r_{14} = 25.967$<br>$r_{15} = 69.262$ | $d_{14} = 4.36$<br>$d_{15} = 1.06$ | $n_8 = 1.60311$ | $\nu_8 = 60.7$ |
| | $L_9$ | $r_{16} = 319.085$<br>$r_{17} = 18.078$ | $d_{16} = 5.12$<br>$d_{17} = 5.62$ | $n_9 = 1.84666$ | $\nu_9 = 23.9$ |
| | $L_{10}$ | $r_{18} = 71.319$<br>$r_{19} = -34.849$ | $d_{18} = 4.50$ | $n_{10} = 1.50137$ | $\nu_{10} = 56.4$ |

8. The wide angle zoom lens system as recited in claim 1, wherein said zoom lens system comprises eleven lenses grouped in three lens groups, in order from the object side to the image side, the first lens group having three lenses, with the first lens $L_1$ being a negative lens and with the second and third lenses $L_2$, $L_3$ being positive lenses, the second group having three lenses, with the fourth and fifth lenses $L_4$, $L_5$ being negative lenses, and with the sixth lens $L_6$ being a positive lens, and the third lens group having five lenses, with the seventh, eighth and ninth lenses $L_7$, $L_8$ and $L_9$ being positive lenses, with the tenth lens $L_{10}$ being a negative lens, with the eleventh lens $L_{11}$ being a positive lens, wherein the radii of curvature $r_1$ to $r_{21}$, the spacing or thickness $d_1$ to $d_{20}$, the refractive indices $n_1$ to $n_{11}$, and the Abbe numbers $\nu_1$ to $\nu_{11}$ of the lenses are as follows:

overall focal length f = 35.996-82.997
viewing angle $2\omega$ = 64.2°-27.8°

| | Lens | radius of curvature | spacing and thickness | refractive index at d-line | Abbe No. |
|---|---|---|---|---|---|
| first lens group I | $L_1$ | $r_1 = 3092.123$<br>$r_2 = 104.769$ | $d_1 = 1.60$<br>$d_2 = 4.33$ | $n_1 = 1.84666$<br>$n_2 = 1.81600$ | $\nu_1 = 23.9$<br>$\nu_2 = 46.6$ |
| | $L_2$ | $r_3 = -570.048$ | $d_3 = 0.16$ | | |
| | $L_3$ | $r_4 = 65.977$<br>$r_5 = 2158.113$ | $d_4 = 4.49$<br>$d_5 = 0.980\text{-}13.236\text{-}19.746$ | $n_3 = 1.65160$ | $\nu_3 = 58.6$ |
| second lens group II | $L_4$ | $r_6 = 11866.281$<br>$r_7 = 21.855$ | $d_6 = 1.45$<br>$d_7 = 9.06$ | $n_4 = 1.88300$ | $\nu_4 = 40.8$ |
| | $L_5$ | $r_8 = -45.651$<br>$r_9 = 185.600$ | $d_8 = 1.19$<br>$d_9 = 0.10$ | $n_5 = 1.61800$ | $\nu_5 = 63.4$ |
| | $L_6$ | $r_{10} = 48.905$<br>$r_{11} = -168.190$ | $d_{10} = 3.40$<br>$d_{11} = 27.770\text{-}15.077\text{-}2.376$ | $n_6 = 1.80518$ | $\nu_6 = 25.4$ |
| third lens group III | $L_7$ | $r_{12} = 125.990$<br>$r_{13} = -138.952$ | $d_{12} = 2.28$<br>$d_{13} = 0.28$ | $n_7 = 1.80400$ | $\nu_7 = 46.6$ |
| | $L_8$ | $r_{14} = 38.738$<br>$r_{15} = 118.930$ | $d_{14} = 2.97$<br>$d_{15} = 0.10$ | $n_8 = 1.80400$ | $\nu_8 = 46.6$ |
| | $L_9$ | $r_{16} = 26.088$<br>$r_{17} = 68.374$ | $d_{16} = 3.11$<br>$d_{17} = 2.57$ | $n_9 = 1.53172$ | $\nu_9 = 48.9$ |
| | $L_{10}$ | $r_{18} = 281.100$ | $d_{18} = 9.66$ | $n_{10} = 1.84666$ | $\nu_{10} = 23.9$ |

-continued

|  | | radius of curvature | spacing and thickness | refractive index of d-line | Abbe No. |
|---|---|---|---|---|---|
| | | $r_{19} = 21.464$ | | | |
| | | | $d_{19} = 1.89$ | | |
| | $L_{11}$ | $r_{20} = 85.120$ | $d_{20} = 4.70$ | $n_{11} = 1.48749$ | $\nu_{11} = 70.1$ |
| | | $r_{21} = -26.537$ | | | |

9. The wide angle zoom lens system as recited in claim 1, wherein said zoom lens system comprises eleven lenses grouped in three lens groups, in order from the object side to the image side, the first lens group having three lenses, with the first lens $L_1$ being a negative lens and with the second and third lenses $L_2$, $L_3$ being positive lenses, the second group having three lenses, with the fourth and fifth lenses $L_4$, $L_5$ being negative lenses, and with the sixth lens $L_6$ being a positive lens, and the third lens group having five lenses, with the seventh, eighth and ninth lenses $L_7$, $L_8$ and $L_9$ being positive lenses, with the tenth lens $L_{10}$ being a negative lens, with the eleventh lens $L_{11}$ being a positive lens, wherein the radii of curvature $r_1$ to $r_{21}$, the spacing or thickness $d_1$ to $d_{20}$, the refractive indices $n_1$ to $n_{11}$, and the Abbe numbers $\nu_1$ to $\nu_{11}$ of the lenses are as follows:

10. The wide angle zoom lens system as recited in claim 1, wherein said zoom lens system comprises ten lenses grouped in three lens groups, in order from the object side to the image side, the first lens group having two lenses, with the first lens $L_1$ being a negative lens and with the second lens $L_2$ being a positive lens, the second group having three lenses, with the third and fourth lenses $L_3$, $L_4$ being negative lenses, and with the fifth lens $L_5$ being a positive lens, and the third lens group having five lenses, with the sixth, seventh and eighth lenses $L_6$, $L_7$ and $L_8$ being positive lenses, with the ninth lens $L_9$ being a negative lens and with the tenth lens $L_{10}$ being a positive lens, wherein the radii of curvature $r_1$ to $r_{19}$, the spacing or thickness $d_1$ to $d_{18}$, the refractive indices $n_1$ to $n_{10}$ and the Abbe numbers $\nu_1$ to $\nu_{10}$ of the lenses are as follows:

overall focal length $f = 36.011$–$83.003$
viewing angle $2\omega = 64.8°$–$28.0°$

| | Lens | radius of curvature | spacing and thickness | refractive index of d-line | Abbe No. |
|---|---|---|---|---|---|
| first lens group I | $L_1$ | $r_1 = 12988.0$ | $d_1 = 1.60$ | $n_1 = 1.84666$ | $\nu_1 = 23.9$ |
| | | $r_2 = 104.685$ | | | |
| | $L_2$ | | $d_2 = 4.49$ | $n_2 = 1.81600$ | $\nu_2 = 46.6$ |
| | | $r_3 = -395.931$ | | | |
| | | | $d_3 = 0.16$ | | |
| | $L_3$ | $r_4 = 45.751$ | $d_4 = 5.74$ | $n_3 = 1.58913$ | $\nu_3 = 61.1$ |
| | | $r_5 = 458.050$ | | | |
| | | | $d_5 = 1.090$–$11.360$–$15.283$ | | |
| second lens group II | $L_4$ | $r_6 = 9802.181$ | $d_6 = 1.45$ | $n_4 = 1.88300$ | $\nu_4 = 40.8$ |
| | | $r_7 = 20.159$ | | | |
| | | | $d_7 = 8.43$ | | |
| | $L_5$ | $r_8 = -40.152$ | $d_8 = 1.18$ | $n_5 = 1.61800$ | $\nu_5 = 63.4$ |
| | | $r_9 = 94.619$ | | | |
| | | | $d_9 = 0.10$ | | |
| | $L_6$ | $r_{10} = 45.094$ | $d_{10} = 3.68$ | $n_6 = 1.80518$ | $\nu_6 = 25.4$ |
| | | $r_{11} = -108.258$ | | | |
| | | | $d_{11} = 27.284$–$15.404$–$2.365$ | | |
| third lens group III | $L_7$ | $r_{12} = -1335.144$ | $d_{12} = 2.02$ | $n_7 = 1.80400$ | $\nu_7 = 46.6$ |
| | | $r_{13} = -73.057$ | | | |
| | | | $d_{13} = 0.28$ | | |
| | $L_8$ | $r_{14} = 43.537$ | $d_{14} = 2.40$ | $n_8 = 1.80400$ | $\nu_8 = 46.6$ |
| | | $r_{15} = 155.661$ | | | |
| | | | $d_{15} = 0.10$ | | |
| | $L_9$ | $r_{16} = 24.992$ | $d_{16} = 4.31$ | $n_9 = 1.53172$ | $\nu_9 = 48.9$ |
| | | $r_{17} = 815.087$ | | | |
| | | | $d_{17} = 0.97$ | | |
| | $L_{10}$ | $r_{18} = -137.003$ | $d_{18} = 10.44$ | $n_{10} = 1.84666$ | $\nu_{10} = 23.9$ |
| | | $r_{19} = 21.786$ | | | |
| | | | $d_{19} = 2.86$ | | |
| | $L_{11}$ | $r_{20} = 227.782$ | $d_{20} = 3.76$ | $n_{11} = 1.48749$ | $\nu_{11} = 70.1$ |
| | | $r_{21} = -25.281$ | | | | overall focal length $f = 36.009$–$83.040$
viewing angle $2\omega = 64.2°$–$28.4°$ -continued

| Lens | | radius of curvature | spacing and thickness | refractive index of d-line | Abbe No. |
|---|---|---|---|---|---|
| first lens group I | $L_1$ | $r_1 = 72.662$ | $d_1 = 2.00$ | $n_1 = 1.80518$ | $\nu_1 = 25.4$ |
| | | $r_2 = 40.993$ | $d_2 = 8.35$ | $n_2 = 1.81600$ | $\nu_2 = 46.6$ |
| | $L_2$ | $r_3 = 387.611$ | | | |
| | | | $d_3 = 0.496\text{-}12.246\text{-}18.987$ | | |
| second lens group II | $L_3$ | $r_4 = 222.420$ | $d_4 = 1.20$ | $n_3 = 1.86300$ | $\nu_3 = 41.5$ |
| | | $r_5 = 22.464$ | | | |
| | | | $d_5 = 11.33$ | | |
| | $L_4$ | $r_6 = -67.497$ | $d_6 = 1.40$ | $n_4 = 1.61800$ | $\nu_4 = 63.4$ |
| | | $r_7 = 66.399$ | | | |
| | | | $d_7 = 0.13$ | | |
| | $L_5$ | $r_8 = 42.414$ | $d_8 = 4.01$ | $n_5 = 1.76182$ | $\nu_5 = 26.6$ |
| | | $r_9 = -288.874$ | | | |
| | | | $d_9 = 29.437\text{-}14.256\text{-}0.473$ | | |
| third lens group III | $L_6$ | $r_{10} = 57.417$ | $d_{10} = 2.37$ | $n_6 = 1.81600$ | $\nu_6 = 46.6$ |
| | | $r_{11} = -336.181$ | | | |
| | | | $d_{11} = 0.09$ | | |
| | $L_7$ | $r_{12} = 30.392$ | $d_{12} = 2.56$ | $n_7 = 1.80400$ | $\nu_7 = 46.6$ |
| | | $r_{13} = 65.991$ | | | |
| | | | $d_{13} = 2.48$ | | |
| | $L_8$ | $r_{14} = 31.617$ | $d_{14} = 2.05$ | $n_8 = 1.64000$ | $\nu_8 = 60.1$ |
| | | $r_{15} = 73.034$ | | | |
| | | | $d_{15} = 1.19$ | | |
| | $L_9$ | $r_{16} = -1264.582$ | $d_{16} = 6.04$ | $n_9 = 1.84666$ | $\nu_9 = 23.9$ |
| | | $r_{17} = 19.660$ | | | |
| | | | $d_{17} = 6.00$ | | |
| | $L_{10}$ | $r_{18} = 109.201$ | $d_{18} = 4.50$ | $n_{10} = 1.54739$ | $\nu_{10} = 53.6$ |
| | | $r_{19} = -34.106$ | | | |

11. The wide angle zoom lens system as recited in claim 5, wherein said zoom lens system comprises eleven lenses group in four lens groups, in order from the object side to the image side, the first lens group I having two lenses, with the first lens $L_1$ being a negative lens and with the second lens $L_2$ being a positive lens, the second lens group II having three lenses, with the third and fourth lenses $L_3$, $L_4$ being negative lenses and with the fifth lens $L_5$ being a positive lens, the lens group III' having one lens, with the sixth lens $L_6$ being a positive lens, and the third lens group III having five lenses, with the seventh, eighth and ninth lenses $L_7$, $L_8$ and $L_9$ being positive lenses, with the tenth lens $L_{10}$ being a negative lens and with the eleventh lens $L_{11}$ being a positive lens, and wherein the radii of curvature $r_1$ to $r_{21}$, the spacing or thickness $d_1$ to $d_{21}$, the refractive indices $n_1$ to $n_{11}$ and the Abbe numbers $\nu_1$ to $\nu_{11}$ of the lenses are as follows:

| | | overall focal length $f = 28.978\text{-}77.5$ viewing angle $2\omega = 78.0°\text{-}30.0°$ | | | |
|---|---|---|---|---|---|
| | lens | radius of curvature | spacing and thickness | refractive index at d-line | Abbe No. |
| first lens group I | $L_1$ | $r_1 = 42.227$ | $d_1 = 1.39$ | $n_1 = 1.84666$ | $\nu_1 = 23.9$ |
| | | $r_2 = 33.485$ | $d_2 = 7.28$ | $n_2 = 1.69680$ | $\nu_2 = 56.5$ |
| | $L_2$ | $r_3 = 208.250$ | | | |
| | | | $d_3 = 0.78\text{-}11.68\text{-}17.66$ | | |
| second lens group II | $L_3$ | $r_4 = 131.553$ | $d_4 = 1.20$ | $n_3 = 1.88300$ | $\nu_3 = 40.8$ |
| | | $r_5 = 17.279$ | | | |
| | | | $d_5 = 7.02$ | | |
| | $L_4$ | $r_6 = -76.950$ | $d_6 = 1.19$ | $n_4 = 1.81600$ | $\nu_4 = 46.6$ |
| | | $r_7 = 42.130$ | | | |
| | | | $d_7 = 0.10$ | | |
| | $L_5$ | $r_8 = 30.339$ | $d_8 = 4.00$ | $n_5 = 1.80518$ | $\nu_5 = 25.4$ |
| | | $r_9 = -2221.231$ | | | |
| | | | $d_9 = 17.85\text{-}6.95\text{-}0.97$ | | |
| lens group III' | $L_6$ | $r_{10} = 73.840$ | $d_{10} = 3.84$ | $n_6 = 1.74400$ | $\nu_6 = 44.7$ |
| | | $r_{11} = -248.553$ | | | |
| | | | $d_{11} = 21.91\text{-}12.33\text{-}2.43$ | | |
| | | $r_{12} = 49.700$ | | | |

-continued

|  | lens |  | radius of curvature | spacing and thickness | refractive index at d-line | Abbe No. |
|---|---|---|---|---|---|---|
| third lens group III | L$_7$ | | r$_{13}$ = 245.000 | d$_{12}$ = 1.61 | n$_7$ = 1.81600 | ν$_7$ = 46.6 |
| | | | | d$_{13}$ = 0.16 | | |
| | L$_8$ | | r$_{14}$ = 35.991 | d$_{14}$ = 2.92 | n$_8$ = 1.77250 | ν$_8$ = 49.6 |
| | | | r$_{15}$ = −146.696 | | | |
| | | | | d$_{15}$ = 1.14 | | |
| | L$_9$ | | r$_{16}$ = −57.377 | d$_{16}$ = 11.02 | n$_9$ = 1.80518 | ν$_9$ = 25.4 |
| | | | r$_{17}$ = 27.625 | | | |
| | | | | d$_{17}$ = 3.41 | | |
| | L$_{10}$ | | r$_{18}$ = −65.656 | d$_{18}$ = 2.34 | n$_{10}$ = 1.84100 | ν$_{10}$ = 43.2 |
| | | | r$_{19}$ = −32.889 | | | |
| | | | | d$_{19}$ = 0.10 | | |
| | L$_{11}$ | | r$_{20}$ = −106.721 | d$_{20}$ = 2.32 | n$_{11}$ = 1.81600 | ν$_{11}$ = 46.6 |
| | | | r$_{21}$ = −46.694 | | | |

12. The wide angle zoom lens system as recited in claim 6, wherein said zoom lens system comprises twelve lens grouped in four lens groups, in order from the object side to the image side, the first lens group I having two lenses, with the first lens L$_1$ being a negative lens and with the second lens L$_2$ being a positive lens, the second lens group II having three lenses, with the third and fourth lenses L$_3$, L$_4$ being negative lenses and with the fifth lens L$_5$ being a positive lens, the third lens group III having a first positive lens group, a negative lens group, and a second positive lens group, in the order from the object side to the image side, the first positive lens group having three lenses, with the sixth, seventh and eighth lenses L$_6$, L$_7$, L$_8$ all being positive lenses, the negative lens group having an lens, with the ninth lens L$_9$ being a negative lens, the second positive lens group having two lenses, with the tenth and eleventh lenses L$_{10}$, L$_{11}$ both being positive lenses, and the lens group III' having one lens, with the twelfth lens L$_{12}$ being a positive lens, and wherein the radii of curvature r$_1$ to r$_{23}$, the spacing or thickness d$_1$ to d$_{22}$, the refractive indices n$_1$ to n$_{12}$ and the Abbe numbers ν$_1$ to ν$_{12}$ of the lenses are as follows:

|  |  | overall focal length f = 28.80–83.00 viewing angle 2ω = 76.2–28.6 | | | |
|---|---|---|---|---|---|
| | lens | radius of curvature | spacing and thickness | refractive index at d-line | Abbe No. |
| first lens group I | L$_1$ | r$_1$ = 98.268 | d$_1$ = 2.00 | n$_1$ = 1.80518 | ν$_1$ = 25.4 |
| | | r$_2$ = 56.851 | | | |
| | L$_2$ | | d$_2$ = 8.06 | n$_2$ = 1.81600 | ν$_2$ = 46.8 |
| | | r$_3$ = 7200.000 | | | |
| | | | d$_3$ = 0.98–9.37–27.63 | | |
| second lens group II | L$_3$ | r$_4$ = 128.547 | d$_4$ = 1.20 | n$_3$ = 1.86300 | ν$_3$ = 41.7 |
| | | r$_5$ = 18.176 | | | |
| | | | d$_5$ = 8.89 | | |
| | L$_4$ | r$_6$ = −75.123 | d$_6$ = 1.40 | n$_4$ = 1.61800 | ν$_4$ = 63.4 |
| | | r$_7$ = 62.479 | | | |
| | | | d$_7$ = 0.10 | | |
| | L$_5$ | r$_8$ = 33.000 | d$_8$ = 3.89 | n$_5$ = 1.76182 | ν$_5$ = 26.6 |
| | | r$_9$ = 2639.805 | | | |
| | | | d$_9$ = 32.08–23.69–5.43 | | |
| third lens group III | L$_6$ | r$_{10}$ = 38.025 | d$_{10}$ = 1.80 | n$_6$ = 1.81600 | ν$_6$ = 46.8 |
| | | r$_{11}$ = 126.500 | | | |
| | | | d$_{11}$ = 0.10 | | |
| | L$_7$ | r$_{12}$ = 23.370 | d$_{12}$ = 1.87 | n$_7$ = 1.80400 | ν$_7$ = 46.6 |
| | | r$_{13}$ = 40.949 | | | |
| | | | d$_{13}$ = 3.54 | | |
| | L$_8$ | r$_{14}$ = 27.773 | d$_{14}$ = 1.78 | n$_8$ = 1.64000 | ν$_8$ = 60.2 |
| | | r$_{15}$ = 63.990 | | | |
| | | | d$_{15}$ = 1.50 | | |
| | L$_9$ | r$_{16}$ = −505.700 | d$_{16}$ = 2.78 | n$_9$ = 1.84666 | ν$_9$ = 23.9 |
| | | r$_{17}$ = 18.425 | | | |
| | | | d$_{17}$ = 2.02 | | |
| | L$_{10}$ | r$_{18}$ = 206.849 | d$_{18}$ = 1.80 | n$_{10}$ = 1.55361 | ν$_{10}$ = 51.2 |
| | | r$_{19}$ = −55.409 | | | |
| | | | d$_{19}$ = 0.50 | | |
| | L$_{11}$ | r$_{20}$ = 755.310 | d$_{20}$ = 1.80 | n$_{11}$ = 1.59270 | ν$_{11}$ = 35.3 |
| | | r$_{21}$ = −60.691 | | | |

-continued

| | | | $d_{21} = 1.09\text{-}8.22\text{-}36.95$ | | |
|---|---|---|---|---|---|
| lens group III' | $L_{12}$ | $r_{22} = 52.200$ $r_{23} = 102.000$ | $d_{22} = 2.50$ | $n_{12} = 1.58144$ | $\nu_{12} = 40.7$ |

* * * * *